United States Patent [19]

Moorehead

[11] 4,044,973
[45] Aug. 30, 1977

[54] NACELLE ASSEMBLY AND MOUNTING STRUCTURES FOR A TURBOFAN JET PROPULSION ENGINE

[75] Inventor: James R. Moorehead, Bellevue, Wash.

[73] Assignee: The Boeing Company, Seattle, Wash.

[21] Appl. No.: 644,915

[22] Filed: Dec. 29, 1975

[51] Int. Cl.² ............................................ B64D 29/06
[52] U.S. Cl. ....................................... 244/54; 248/5; 60/39.31
[58] Field of Search ..................................... 244/53–55; 60/39.31, 226 R, 226 A; 248/5, 9

[56] References Cited

U.S. PATENT DOCUMENTS

| | | | |
|---|---|---|---|
| 2,523,504 | 9/1950 | Ford | 248/5 |
| 2,676,459 | 4/1954 | Marchant | 60/39.31 |
| 2,818,225 | 12/1957 | Kent | 244/54 |
| 2,863,620 | 12/1958 | Vautier | 248/5 |
| 3,222,017 | 12/1965 | Bobo | 248/5 |
| 3,327,965 | 6/1967 | Bockrath | 244/54 |
| 3,352,114 | 11/1967 | Wilde et al. | 60/39.31 |
| 3,397,855 | 8/1968 | Newland | 248/5 |
| 3,490,556 | 1/1970 | Bennett, Jr. et al. | 244/54 |
| 3,511,055 | 5/1970 | Timms | 60/39.31 |
| 3,540,682 | 11/1970 | Dibble et al. | 244/53 R |
| 3,541,794 | 11/1970 | Johnston et al. | 60/39.31 |
| 3,727,862 | 4/1973 | Kaufhold et al. | 244/54 |
| 3,750,983 | 8/1973 | Morris | 60/226 R |
| 3,779,006 | 12/1973 | Lewis et al. | 60/39.31 |
| 3,837,602 | 9/1974 | Mullin | 244/54 |
| 3,867,813 | 2/1975 | Leibach | 60/226 R |

FOREIGN PATENT DOCUMENTS

| | | | |
|---|---|---|---|
| 1,406,595 | 10/1968 | Germany | 244/54 |
| 602,256 | 5/1948 | United Kingdom | 244/54 |
| 866,018 | 4/1961 | United Kingdom | 60/39.31 |
| 1,030,521 | 5/1966 | United Kingdom | 244/54 |

Primary Examiner—Trygve M. Blix
Assistant Examiner—Galen Barefoot
Attorney, Agent, or Firm—Christensen, O'Connor, Garrison & Havelka

[57] ABSTRACT

A nacelle assembly including an inlet channel, an exterior cowl, a fan channel, and a turbine exhaust nozzle is directly mounted on a turbofan jet propulsion engine. The engine in turn is shock mounted directly on a strut, in turn affixed to an aircraft. A central portion of the outer cowl is hinged to open in a clam shell manner about hinges positioned adjacent the strut location to expose the fan casing and engine accessories for maintenance and removal. A rearward portion of the nacelle assembly is formed in two D-duct structures that are also hinged to open in a clam shell manner about hinges positioned adjacent the strut location. The D-duct structures include portions of the outer cowl and of the fan duct walls. When the D-duct structures are open, the turbine casing of the turbofan engine is exposed for maintenance, repair and removal. A pair of beams, affixed at one end to the aircraft fuselage, and enclosed by an aerodynamic fairing, constitute the mounting strut. The beams extend beyond the fairing into the nacelle and through a fan duct bifurcating structure. The forward of the two beams forks into a yoke-like structure that surrounds a portion of and is affixed by shock mounts to the exterior of the fan casing. The rear beam is also affixed to the turbine casing by a shock mount.

14 Claims, 24 Drawing Figures

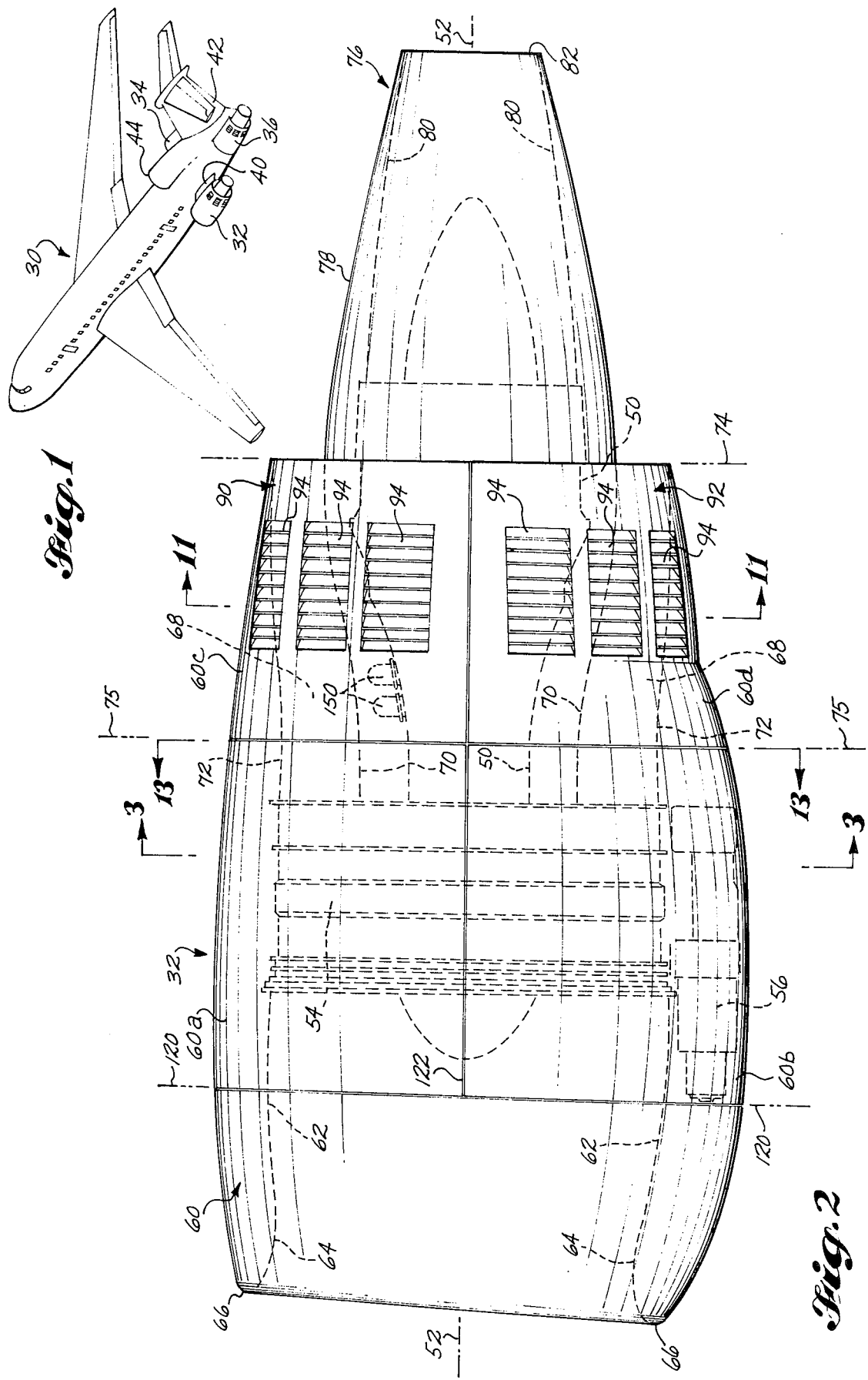

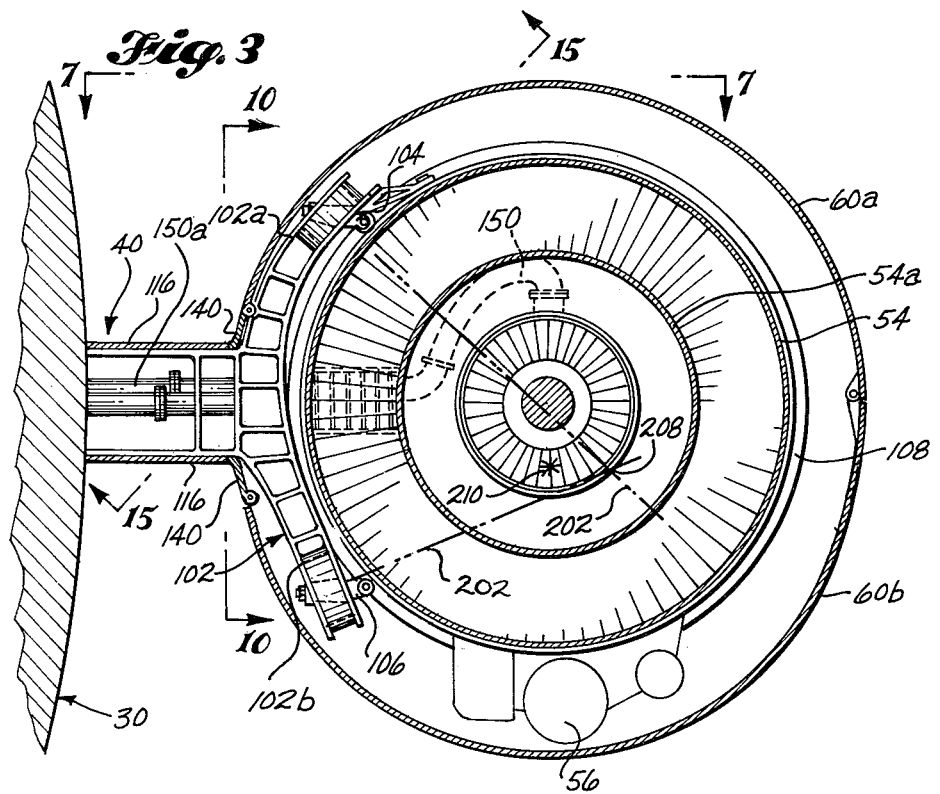
Fig. 3
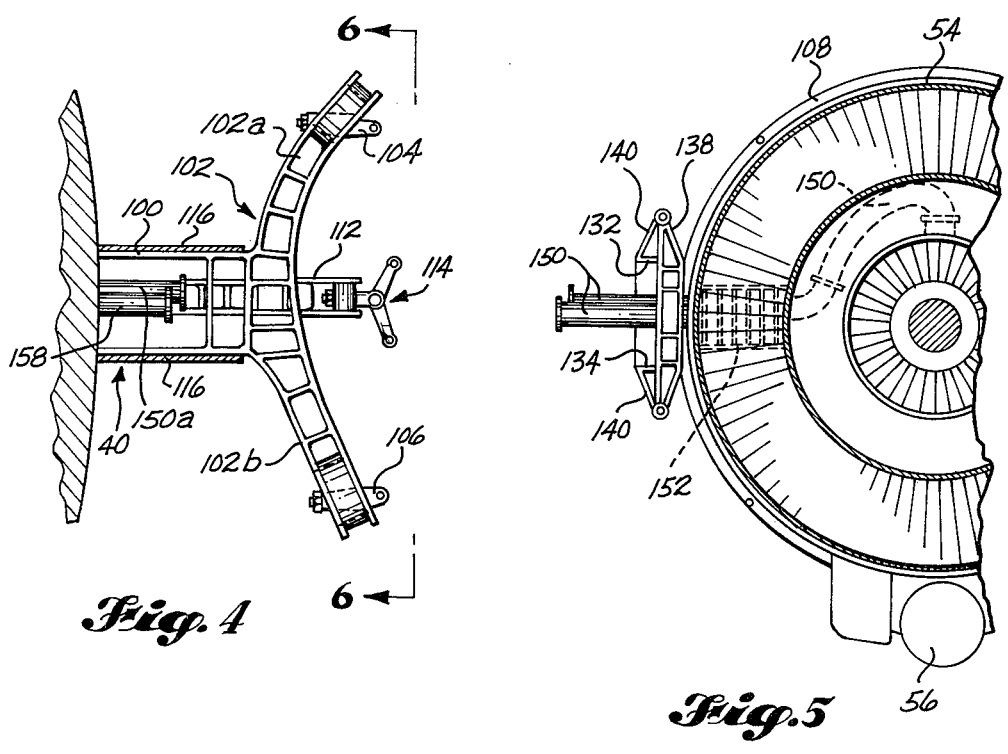
Fig. 4
Fig. 5

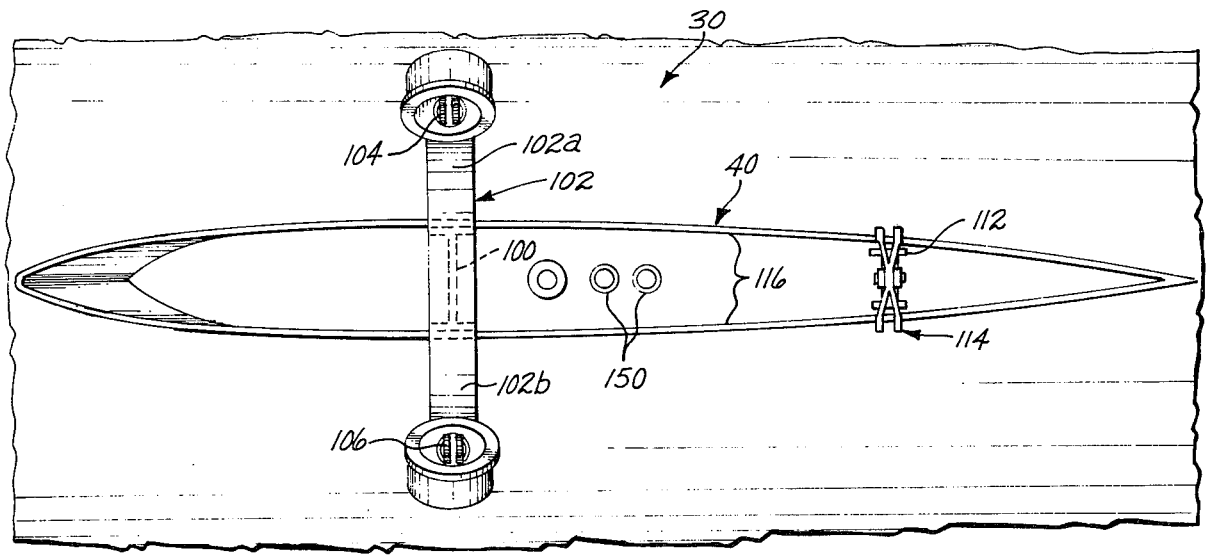
Fig. 6
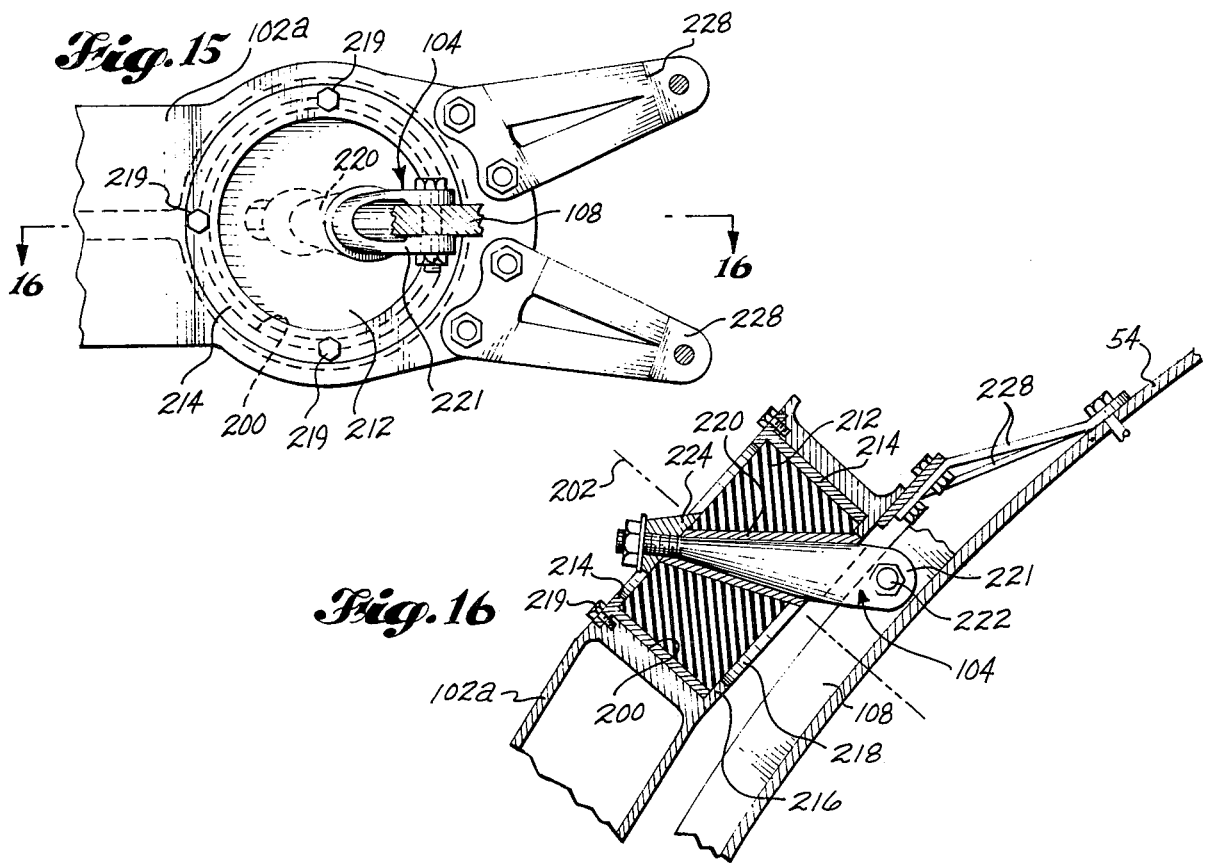
Fig. 15
Fig. 16

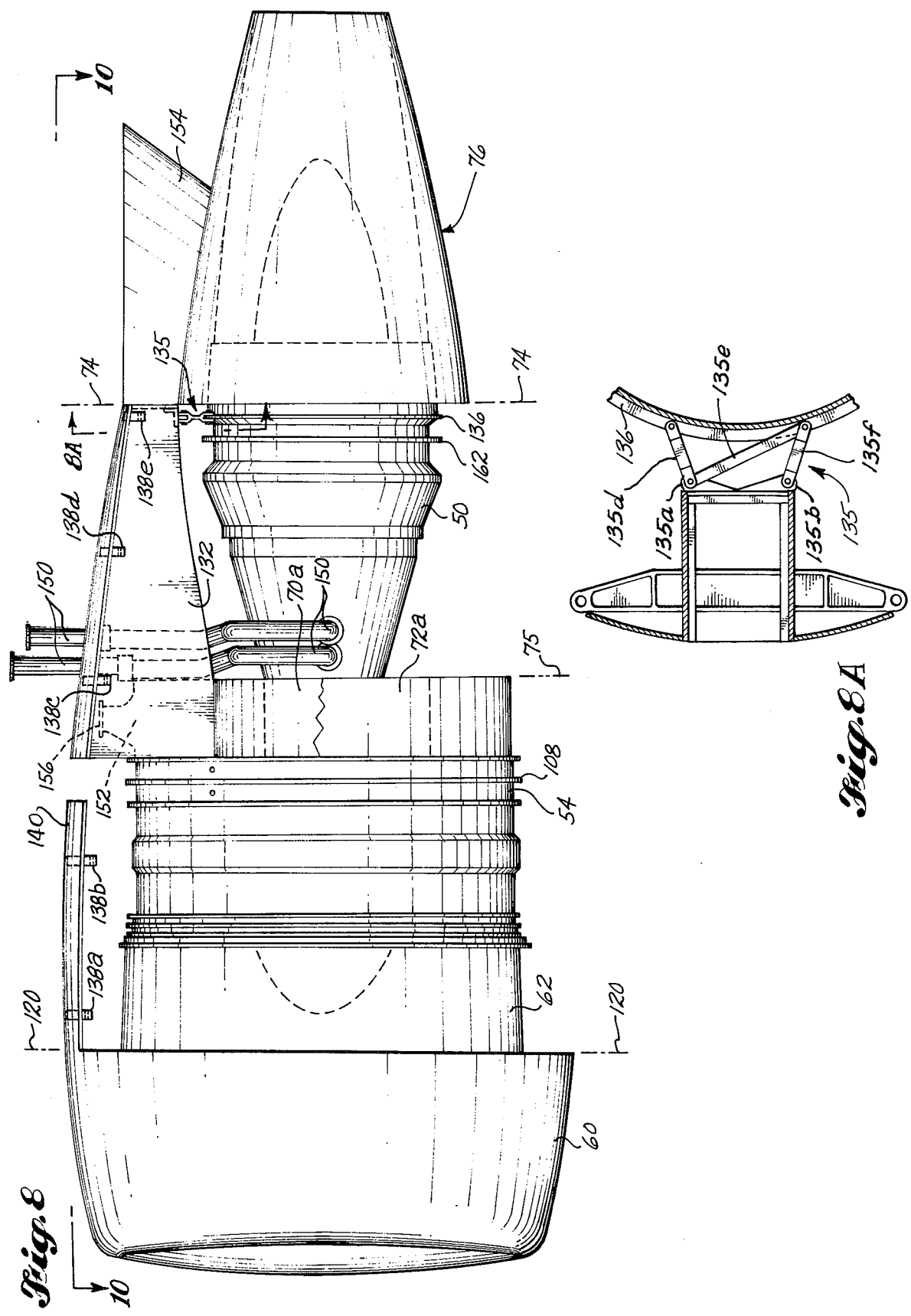

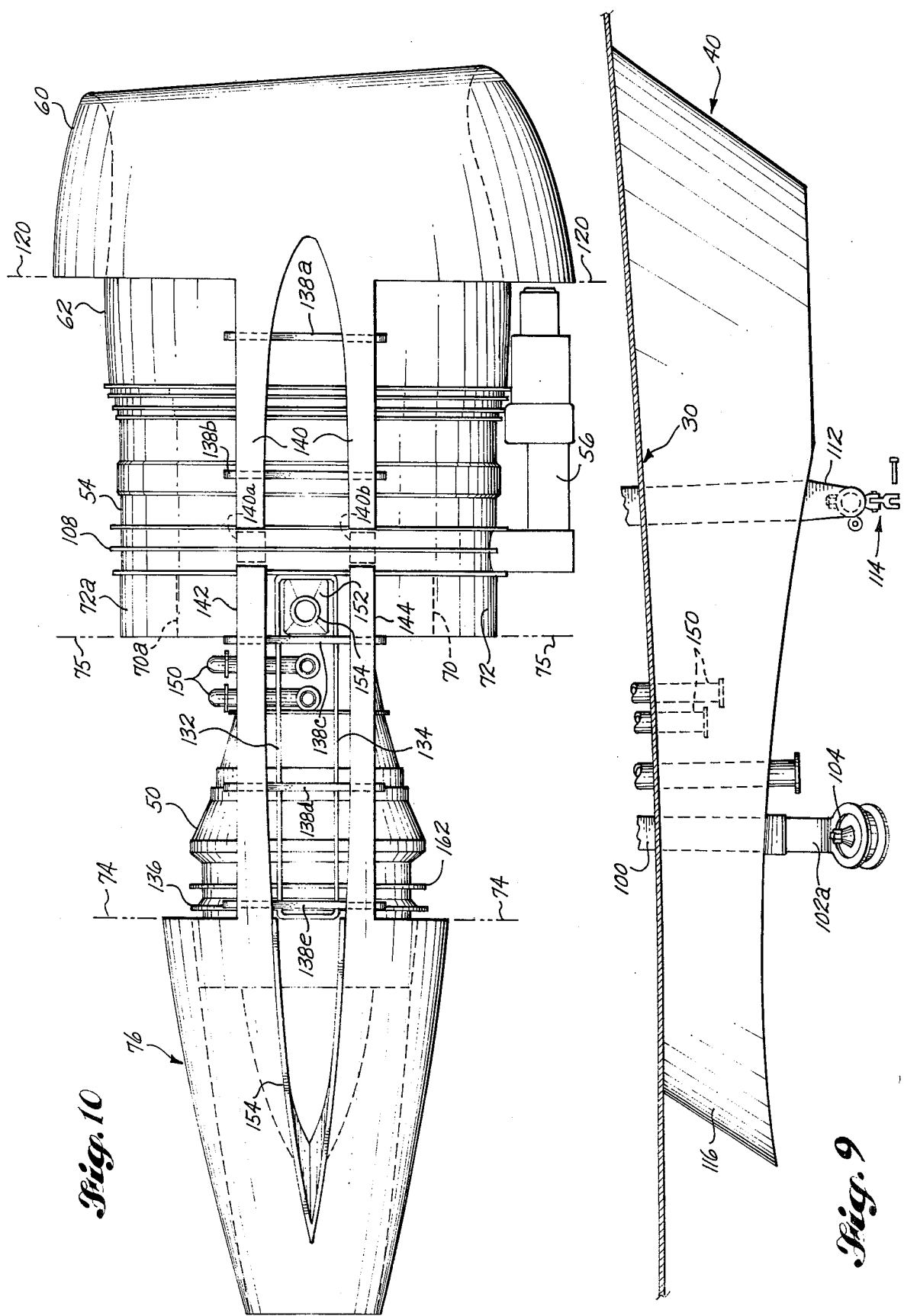

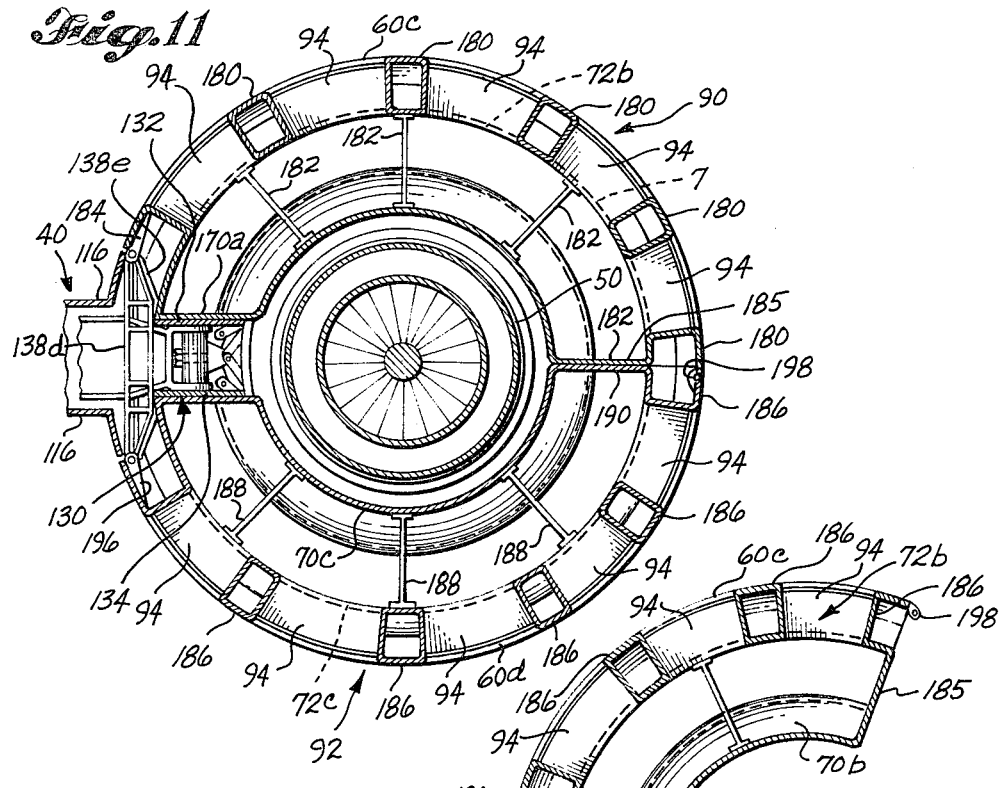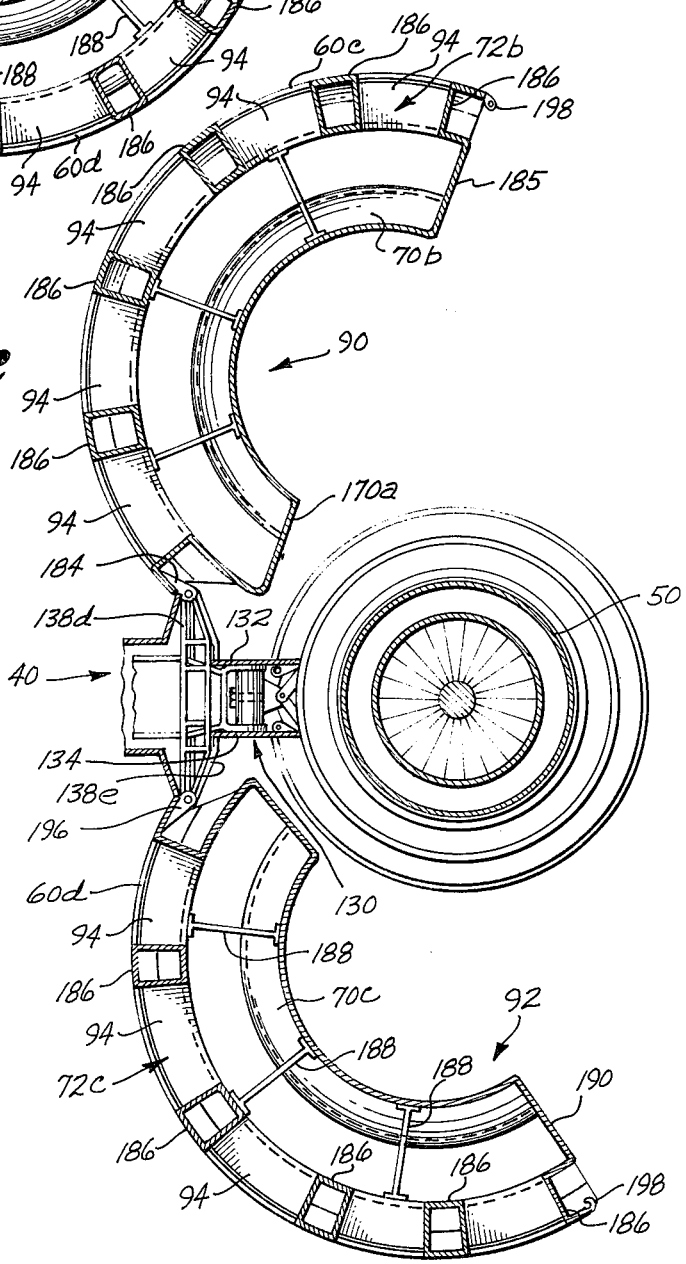

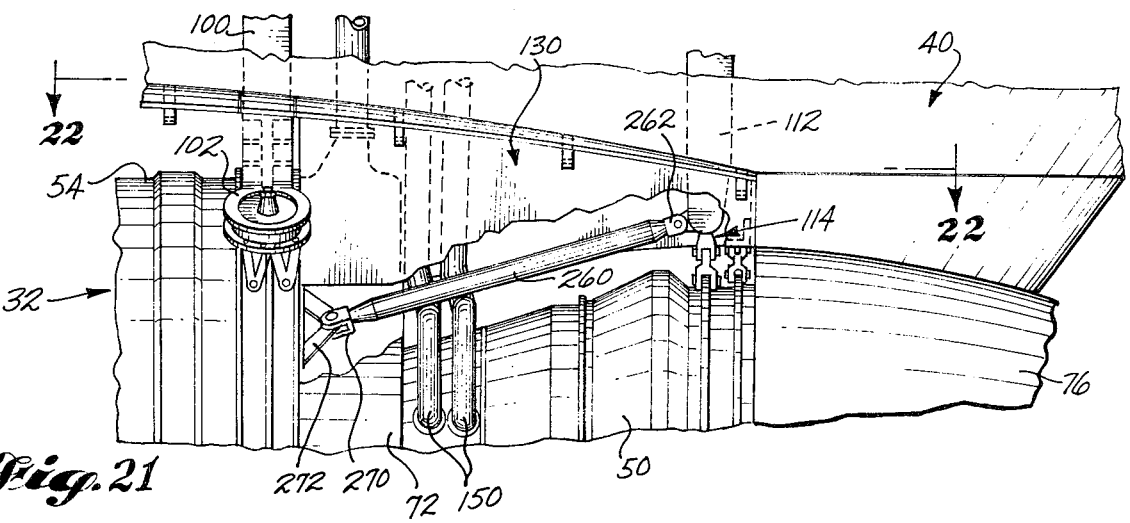
Fig. 21
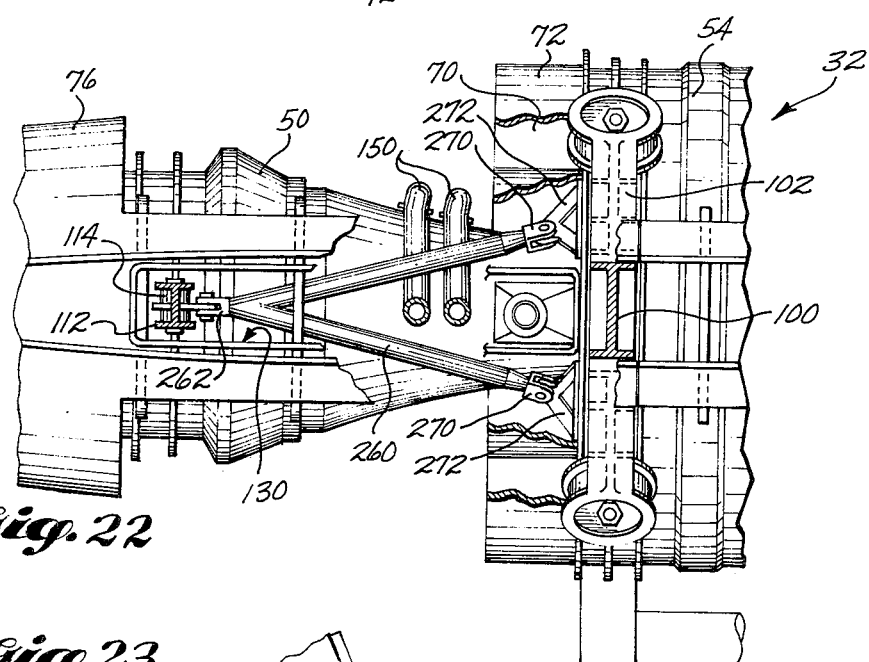
Fig. 22
Fig. 23
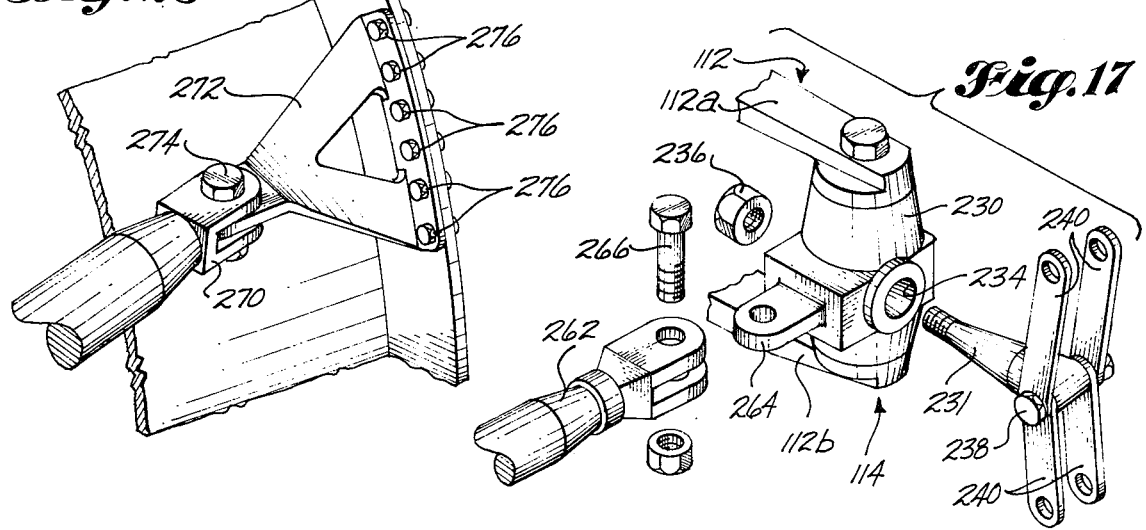
Fig. 17

NACELLE ASSEMBLY AND MOUNTING STRUCTURES FOR A TURBOFAN JET PROPULSION ENGINE

BACKGROUND OF THE INVENTION

The present invention relates to a nacelle assembly and mounting assembly for a turbofan jet propulsion engine, and more particularly, to a nacelle assembly that is attached directly to the engine and to structure for shock mounting the entire engine and nacelle structure on an aircraft.

On some aircraft, jet propulsion engines are mounted adjacent the tail of the aircraft on each of the starboard and port sides of the fuselage. A variation of this configuration includes a third engine mounted in the tail of the aircraft with appropriate inlet ducting routed through the fuselage and having an inlet opening situated above the fuselage forwardly of the vertical stabilizer. These jet propulsion engines must be mounted on the aircraft by structure that can withstand the torque and axial loads generated by the engines and yet provide shock absorbing qualities to reduce or eliminate the vibrational energy transmitted from the engine through the mounting structure to the aircraft.

Two mounting arrangements have been used for mounting straight turbine type and low bypass turbofan jet propulsion engines of the prior art on aircraft. In one of the arrangements, shock absorbing mounting structure is attached directly to the turbine casing or to both the turbine and fan casing, as the case may be. In such a mounting arrangement, the nacelle structure is rigidly affixed to the shock mounting structure, necessitating the use of complex seals and complex vibration and shock mounting structure to allow for movement of the engine relative to the nacelle. In the other arrangement, the engine is shock mounted within a load bearing nacelle structure, which is in turn affixed to the aircraft fuselage, requiring a relatively strong but heavy nacelle structure.

With the advent of the high bypass turbofan engine, these prior art mounting techniques are undesirable for mounting the high bypass turbofan engines on an aircraft. For example, a stress bearing nacelle assembly must be constructed so that the entire nacelle can withstand and transmit the thrust and axial loads generated by the engine to the aircraft fuselage. Since large bypass turbofan engines require relatively large diameter nacelle structures, a significant weight penalty is incurred as the weight of an already relatively heavy stress bearing cowl increases with its size. Low bypass turbofan engines have in the past been directly shock mounted to fuselage structure by directly connecting the fan casing to a first mount and the turbine casing to a second mount.

The bleed air conduits and other accessory equipment normally exit from the top of the fan casing in a low bypass engine and for side fuselage mounted engines, must then extend peripherally or circumferentially around a portion of the fan casing and inwardly toward the fuselage through the mounting strut. With high bypass turbofan engines, this becomes impractical as routing the bleed air conduits and other accessories around the fan casing requires a substantial amount of diametral space and thus results in a large cowl cross section. Large diameter cowls are undesirable as the drag created by a cowl increases geometrically with its cross-sectional area. Moreover, such prior art nacelles have been constructed so that the the nacelle is rigidly affixed to the strut and/or to the fuselage. Such a mounting arrangement requires provision, then, for movement of the engine relative to the nacelle structure, increasing the complexity and weight of that structure.

Present day aircraft employing the foregoing engine configuration require separate and individually designed and constructed mounting structure and nacelle assemblies for each of the two or three engines, necessitating a significant initial investment in nacelle design and development. It is therefore desirable to design an engine and nacelle structure that can be interchanged among several engine mounting locations on a single aircraft without the necessity for substituting a large number of nacelle components.

It is therefore a broad object of the present invention to provide a structure for mounting and cowling a high bypass turbofan jet propulsion engine on an airplane, which structure can be employed to mount the engine on either side of the fuselage of an aircraft and also in the tail portion of an aircraft having a three engine configuration. Further objects of the present invention are to provide a light, strong, non-stress bearing nacelle assembly; to provide a nacelle assembly mounted directly on the engine that is free to move with the engine relative to the aircraft and the mounting structure; to provide a structure for shock mounting the engine and nacelle assembly to the aircraft; to provide a means for routing accessory bleed air and fuel conduits from the engine to the aircraft; to provide a versatile nacelle assembly and engine structure that can be interchangeably mounted on either the port or starboard sides of the fuselage of an aircraft or in the tail of an aircraft; to provide a relatively small diameter cowl for a high bypass turbofan engine; to provide a cowl structure with removable panels for easy access to the accessories for maintenance and repair; to provide fan air thrust reversing assemblies integrated into the cowl; to provide a nacelle assembly employing integrated turbine cowl, fan channel walls and exterior cowl members that can be easily opened and/or removed for direct access to the turbine core, including the burner assembly of the turbine; to provide an engine and a nacelle assembly that are integrated in design and structure and mutually supporting; to provide a nacelle assembly wherein all of the nacelle and engine components are mounted on the engine; to provide a shock mounting system for directly coupling a high bypass turbofan engine to a mounting strut or other aircraft structure; and to provide a mounting structure and nacelle assembly for a turbofan engine wherein vibration absorbing displacements occur between the engine/nacelle structure and airplane fixed structure.

SUMMARY OF THE INVENTION

In accordance with the foregoing objects and other objects that will become apparent to one of ordinary skill in the art after reading the following specification, the present invention provides an improved structure for interchangeably mounting a high bypass turbofan engine at a number of different locations on an aircraft fuselage and a nacelle assembly that is attached directly to the engine. The improved structure for interchangeably mounting the turbofan engine to a plurality of locations on a fuselage comprises a structural yoke that extends around a portion of the periphery of the fan casing and means for fixing the yoke to the fuselage of the airplane. One end of the structural yoke is connected by a shock absorbing mounting means to a first location on the fan casing while the other end of the yoke is connected to the engine by a second shock absorbing mounting means attached to a second location on the periphery of the fan casing. A rear mounting arm is affixed by a third shock absorbing mounting means to the turbine casing at a location rearwardly from the fan casing. Both the structural yoke and the arm have portions that extend substantially radially outwardly from the engine toward the fuselage and are attached to structural components in the fuselage. The nacelle assembly is affixed directly to the engine and has openable panels therein for access through the cowl and portions of the fan duct to the engine accessories as well as to the turbine casing itself in the region of the burner assembly. An aerodynamic fairing extends between the engine nacelle and the aircraft fuselage to encase the mounting arms and complete the mounting strut. The nacelle defines an inlet duct for the fan as well as an annular fan duct extending rearwardly from the fan and surrounding the turbine casing. The nacelle includes a first annular wall located forwardly from and coupled to the forward portion of the fan casing to define the inlet channel to the fan, and a second annular wall located rearwardly from and coupled to the outer, rearward portion of the fan casing to form a portion of the outer wall of the fan channel. A third annular wall is located rearwardly from the fan casing and is spaced inwardly from the second wall and coupled to the fan casing to form a portion of the inner wall of the annular fan duct. A fourth, generally annularly shaped wall surrounds and is spaced outwardly from the first and second walls to form the outer aerodynamic cowl of the engine. The rearward portion of the cowl and the rearward portion of the outer fan duct wall terminate in a rearward opening formed between the inner fan duct wall and the merged portions of the cowl and outer fan duct wall to define the exit plane of the annular fan nozzle. A bifurcation means is interposed in the annular fan channel adjacent the location of the mounting strut. In a preferred embodiment the bifurcation means is located rearwardly from the fan casing and has a channel therethrough placing the space between the inner fan duct wall and the turbine casing in communication with the space between the second wall and the fourth wall. Both the forward and rearward mounting arms extend through the channel in the bifurcation means. In addition, fuel lines and high pressure compressor bleed air lines extend from the turbine and wrap, if necessary, around the turbine casing to a location adjacent the bifurcation means and thereafter outwardly through the bifurcation means toward the aircraft fuselage. The bifurcation means is directly mounted on the engine and serves as fixed structure on which the openable access panels are hinged.

BRIEF DESCRIPTION OF THE DRAWINGS

A better understanding of the present invention can be derived by reading the ensuing specification in conjunction with the accompanying drawings wherein:

FIG. 2 is an elevation view of the port side nacelle assembly of the present invention;

FIG. 3 is a cross-sectional view of the nacelle assembly and mounting structure of the present invention taken along section line 3—3 of FIG. 2;

FIG. 4 is a cross-sectional view similar to FIG. 3 of the mounting strut with the engine and nacelle assembly removed;

FIG. 5 is a cross-sectional view similar to FIG. 3 of the engine and nacelle assembly removed from the mounting strut with the outer cowl omitted;

FIG. 6 is a longitudinal elevation view of the mounting strut of the present invention taken along view line 6—6 of FIG. 4;

FIG. 7 is a plan view of the engine, the nacelle assembly and the mounting strut of the present invention with a portion of the outer cowl and rear fan ducting omitted;

FIG. 8 is a plan view similar to FIG. 7 of the engine and nacelle assembly removed from the mounting strut;

FIG. 8A is an enlarged cross-sectional view of the attachment bracket for the fan channel bifurcation structure of the present invention taken along section line 8A—8A of FIG. 8;

FIG. 9 is a plan view similar to FIG. 7 of the mounting strut structure removed from the engine and nacelle assembly;

FIG. 10 is a side elevation view of the structure of FIG. 8 taken along view line 10—10 of FIG. 8;

FIG. 11 is a cross-sectional view of the engine, nacelle assembly, and mounting structure taken along section line 11—11 of FIG. 2;

FIG. 12 is a cross-sectional view similar to FIG. 11 showing the fan duct and outer cowl at the rear portion of the nacelle assembly hinged to its open position to expose the casing of the turbine engine;

FIG. 15 is a sectional view of the vibration absorbing, shock mounting for attaching the forward mounting member to the fan casing taken along section line 15—15 of FIG. 3;

FIG. 16 is a sectional view of the shock mounting structure taken along section line 16—16 of FIG. 15;

FIG. 17 is an isometric view of a shock mounting assembly for connecting the rear mounting beam to the turbine casing and for attaching an auxiliary thrust bearing yoke to the rear mounting beam;

FIG. 21 is a view similar to a portion of FIG. 7 showing an auxiliary thrust bearing yoke integrated into the mounting structure of the present invention;

FIG. 22 is a partially broken away sectional view of the structure of FIG. 21 taken along section line 22—22;

FIG. 23 is an enlarged, isometric view of a connecting bracket for the auxiliary thrust yoke illustrated in FIGS. 21 and 22.

DETAILED DESCRIPTION

Figure 1:
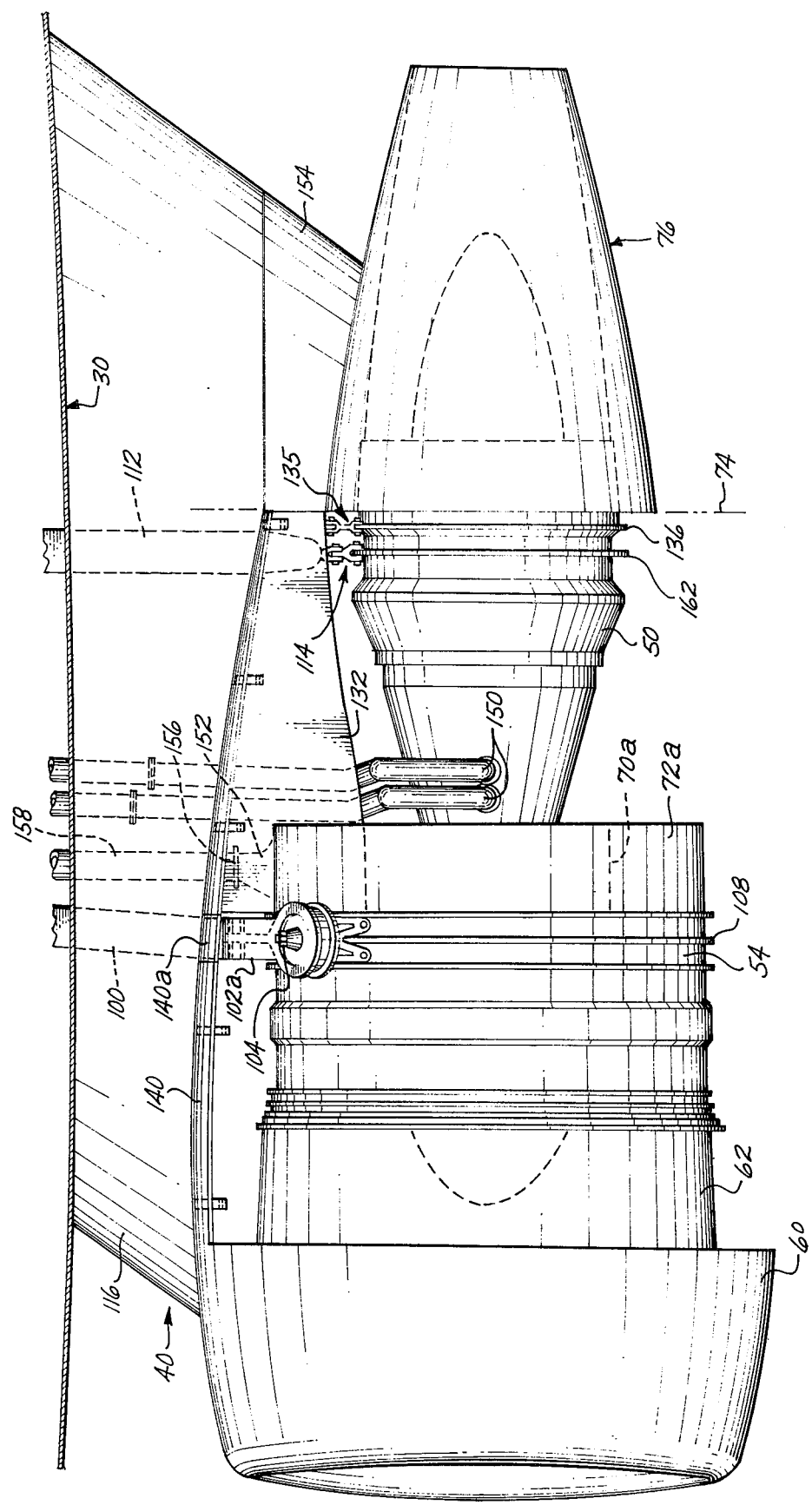
FIG. 1 is a rear, isometric view of an aircraft having two strut mounted, high bypass turbofan engines located on the sides of the fuselage and a single high bypass turbofan engine mounted in the aft end of the fuselage.

Referring to FIG. 1, a three engine, jet propelled, passenger-type aircraft of conventional design 30 employs three high bypass turbofan engines 32, 34 and 36 for propulsion. Each of the engines has a relatively large diameter, high bypass fan driven by a turbine engine. The port turbofan engine 32 is mounted on a strut 40 extending outwardly from the port side of the fuselage adjacent its aft end. The starboard turbofan engine 34 extends outwardly from a strut (not seen in FIG. 1) extending outwardly from the starboard side of the fuselage adjacent its aft end. The third turbofan engine 36 is positioned in the aft end of the fuselage and is mounted on an internal fuselage strut positioned below the vertical stabilizer 42 of the aircraft. Inlet ducting for the turbofan engine 36 extends internally in a forward and upward direction through the aircraft fuselage and terminates in an inlet 44 positioned forwardly of the vertical stabilizer 42 on the top of the fuselage.

The present invention relates to the nacelle assembly and mounting structure for turbofan engines arranged in a configuration similar to that just described. Each of the turbofan engines employs common portions of the nacelle assembly and can be interchanged, with very few modifications with the engines mounted on either the port or starboard side or the aft end of the fuselage. The port engine 32 will be taken as representative. Referring to the greatly enlarged view of the port engine 32 of FIG. 2, the high bypass turbofan engine is shown in ghost outline surrounded by the nacelle assembly. The turbofan jet propulsion engine is of conventional design and includes a turbine casing 50 housing a high pressure compressor, a burner, and a turbine (not shown). The turbine is connected to a central shaft (not shown) running along the center line 52 of the engine, which in turn drives the high pressure compressor. A large diameter, high bypass fan (not shown) is surrounded by a fan casing 54 adjacent the forward end of the turbine casing 50. An annular fan housed within the fan casing 54 is driven from the turbine shaft. The engine accessories 56, such as the starter and the alternator, are mounted on the bottom of the fan casing 54. The diameter of the fan casing of such high bypass turbofan engines is significantly larger than the diameters of the fan casing of low bypass turbofan engines or the turbine casing of turbojet engines used on such aircraft in the past, necessitating a relatively large diameter nacelle assembly.

Generally, the nacelle assembly of the present invention for the turbofan engine 32 includes an outer skin or wall 60 hereinafter referred to as the cowl. The cowl 60 is generally annular in configuration, although the bottom portion is somewhat vertically prolate in the preferred embodiment to provide space to house engine accessories 56. An annular inlet wall 62 forms the inlet channel for the fan and high pressure compressor of the turbofan engine. The rearward end of the inlet wall 62 is attached to the circular outer periphery of the fan casing 54 and extends forwardly therefrom, first diverging slightly to the inlet throat 64 adjacent the forward end of the nacelle wherein the inlet wall 62 has a minimum diameter. The inlet wall converges from the throat as it extends forwardly to the forwardmost point 66 of the nacelle, generally designated the highlight. At the highlight, the inlet wall 62 merges into the forward portion of the cowl 60. From the highlight 66, the cowl extends rearwardly while slightly radially diverging relative to the engine center line, in a smooth aerodynamic shape.

An annular fan duct, generally designated 68, is defined between an annular inner fan duct wall 70 and an outer fan duct wall 72. The inner fan duct wall 70 has its forward end affixed to the fan casing 54 at a location spaced radially inwardly from the outer periphery of the fan casing. The inner fan duct wall 70 is also spaced radially outwardly from the turbine casing 50. As the inner fan duct wall 70 extends rearwardly from the fan casing 54, it diverges or flares outwardly past the burner section of the turbine and terminates in a rearward edge defining the fan nozzle exit plane 74, which is oriented orthogonally to the engine center line 52 and located adjacent the rearward portion of the turbine casing 50. At this location, a fixed turbine nozzle 76 having an outer wall 78 and an inner wall 80 is affixed to the aft end of the turbine casing 50. The outer wall 78 of the nozzle converges as it forms a smooth rearward continuation of the inner fan duct wall and extends rearwardly from the aft end of the turbine casing. The outer nozzle wall 78 terminates in a circular opening 82 defining the nozzle exit plane of the turbine engine, which is oriented perpendicularly to the center line 52 of the engine. The inner wall 80 of the fixed turbine nozzle 76 is spaced radially inwardly from the outer wall and extends rearwardly from the turbine casing, converging and then merging with the outer wall 78 of the nozzle adjacent the nozzle opening 82. The forward end of the inner wall 80 of the turbine nozzle is affixed to the aft end of the turbine casing 50 to direct hot exhaust gasses from the turbine rearwardly and out the nozzle opening 82. The outer fan duct wall 72 is annularly shaped and has its forward end affixed to the outer rearward periphery of the fan casing 54. The outer fan duct wall 72, spaced radially outwardly from the inner fan duct wall 70, extends rearwardly from the fan casing 54 and radially diverges as it extends rearwardly to merge with the cowl 60 adjacent the fan nozzle exit plane 74, oriented generally perpendicularly to the center line 52 of the engine. Thus the low pressure air exhausted from the fan casing 54 travels through the annular fan duct 68 and is directed rearwardly around the turbine nozzle 76 and the turbine exhaust stream exiting from the turbine nozzle 76.

As will be better understood by the ensuing description, a central portion of the outer cowl 60 is separated from the fore and aft portions of the outer cowl 60 to form a pair of removable cowl panels 60a and 60b. In the port engine depicted, removable cowl panel 60a is semi-annular in configuration and surrounds the upper portion of the fan casing 54, that is, cowl panel 60a has an inverted U-shape in cross section. Removable cowl panel 60b surrounds the lower portion of the fan casing 54 and the engine accessories 56 and is also semi-annular in configuration, having a U-shape in cross section. As will also be better understood when reading the ensuing specification, the upper aft portions of the inner fan duct wall 70, the outer fan duct wall 72 and the cowl 60c are mutually interconnected and separated from the forward portion of the respective members to form an upper, removable cowl and fan duct section, hereinafter referred to as "upper D-duct" 90. Likewise, the lower aft portions of the inner fan duct wall 70, the outer fan duct wall 72 and the cowl 60d are mutually interconnected and separated from the respective forward portions of those members to form a lower, removable duct section, hereinafter referred to as "lower D-duct" 92. Also, as will be explained in more detail below, fan air reversing cascade panels 94 are spaced circumferentially around the periphery of the upper and lower D-ducts 90 and 92 and cooperate with movable door panels (not shown) forming part of the outer fan duct wall 72 to divert the low pressure fan air travelling through the fan duct 68 into the cascade panels 94 to reverse the fan air exhaust stream in a conventional manner for reversing the thrust and braking the aircraft upon landing.

The turbofan engine 32 is mounted on the aircraft by forward and rear mounting members. These members as well as their interconnection with the engine are best viewed in FIGS. 3 through 10. The forward mounting member comprises a forward mounting beam 100 having its inner end attached to structure in the aircraft fuselage 30 and extending outwardly from the side of the fuselage to a location spaced outwardly from the outer surface of the fuselage, and an integral mounting member 102 integrally joined to the outer end of the forward mounting beam 100. The yoke 102 has an upper arm 102a and a lower arm 102b that extend generally vertically in mutually opposite directions from the outer end of the beam 100 and curve about the fan casing 54. The ends of the upper and lower arms 102a and 102b are spaced radially outwardly from the outer surface of the fan casing 54. Conical connection pins 104 and 106 are shock mounted in the upper and lower ends of the arms 102a and 102b by means to be described in greater detail below. The connecting pins 104 and 106 are attached to a radially outwardly extending, annular, circumferential ring 108 integral with and surrounding the fan casing 54. The rear mounting member comprises a beam 112 having its inner end attached to structure in the aircraft fuselage 30 and extending outwardly from the outer surface of the fuselage 30 to a location adjacent the engine turbine casing 50. A shock mounting assembly generally designated 114, is affixed to the outer end of the rear mounting beam 112 and is attached to the turbine casing by means described more completely below. An aerodynamic strut fairing 116 having an airfoil shape encloses the forward and rearward mounting beams 100 and 112 between the outer surface of the fuselage 30 and the cowl 60. Both the forward and rearward mounting beams are made from lightweight, structural, stress-bearing material such as aluminum or aluminum alloy. The beams are machined from stock and include lightening holes to optimize the strength-to-weight ratio of the members.

Referring to FIGS. 5, 8 and 10, the turbofan engine and nacelle assembly of the present invention are shown with the cowl panels 60a and 60b (FIG. 1) and the D-duct sections 90 and 92 removed. The rearward end of the inlet wall 62 is affixed to the forward periphery of the fan casing 54 and extends forwardly therefrom to the inlet highlight 66. The forward portion of the cowl 60 extends rearwardly from the highlight to the location of the forward edge of the removable cowl panels 60a and 60b (FIG. 1). The separation location of the cowl panels 60a and 60b from the forward portion of the cowl 60 is along a plane designated 120, oriented perpendicular to the center line 52 of the engine structure, which plane 120 is located forwardly from the entrance plane to the fan casing 54. As seen in FIG. 2, the upper cowl panel 60a is also separated from the lower cowl panel 60b along a longitudinally extending separation line 122 on the outboard side of the cowl. Likewise the upper and lower D-ducts are separated along a rearward extension of the line 122. This separation line 122 lies in or is adjacent to a horizontal reference plane (not shown) intersecting the center line 52 of the engine. The location of the longitudinal line 122 is not critical and can be positioned in, above or below the horizontal reference plane.

As viewed in FIGS. 7, 8 and 10, a box structure, generally designated 130, is affixed to the inboard side of the turbofan engine. The box structure includes upper and lower walls 132 and 134 that are spaced respectively above and below and are parallel to the horizontal reference plane intersecting the center line 52 of the engine. The forward end of the upper and lower walls 132 and 134 are attached to the fan casing 54 of the turbofan engine and extend outwardly from a location adjacent the inner fan channel wall to a location adjacent the cowl 60. The inner longitudinal edges of the walls 132 and 134 are spaced from the turbine casing 50 and generally follow the contour of the inner fan duct wall 70, leaving open the vertical space between the inner edges of the walls 132 and 134. The rearward transverse edges of the upper and lower walls 132 and 134 terminate in or adjacent a reference plane defined by the fan nozzle exit plane exit plane 74 located at the forward end of the fixed turbine nozzle structure 76. The rearward ends of the upper and lower walls 132 and 134 are joined by a vertically oriented end wall 133 adjacent the reference plane 74. An attachment bracket 135 (shown enlarged in FIG. 8A) affixes the aft inner portions of the box structure 130 to an annular, circumferential mounting ring 136 forming part of the turbine casing 50.

Referring to FIG. 8A, portions of the nacelle assembly and engine behind the attachment bracket 135 have been omitted for simplicity. The attachment bracket 135 for attaching the rearward end of the box structure 130 to the turbine casing 50 comprises a pair of vertically spaced flanges, 135a and 135b, that are affixed to a vertical stiffening bar 135c located adjacent the rearward end of the box structure and that extend inwardly toward the turbine casing. Three links 135d, e and f form a trusswork that interconnects the flanges 135a and b with the annular attachment ring 136 on the casing. One of the links 135d extends between the upper flange 135a and an upper location on the attachment ring, while the other two links 135e and f extend respectively from the two flanges 135a and b to a location on the attachment ring spaced below the upper location. The links are connected to the flanges and the attachment ring in a conventional manner, as by suitably sized pins or bolts.

A plurality of vertically oriented stiffening ribs 138 spaced longitudinally along the inboard side of the cowl 60 have an outer edge that conforms generally to the circumferential curvature of the inner surface of the cowl. Three of the stiffening ribs 138 are located outwardly from the turbine casing adjacent the outer edge of the box structure 130. Additional stiffening ribs 138 are spaced forwardly from the first three and are located outwardly from the fan casing 54 and the inlet wall 62. The upper and lower walls 132 and 134 extend outwardly toward the first three ribs and are attached to the ribs to fix the vertical spacing of the outer edges of the upper and lower walls 132 and 134.

Referring to FIG. 10 a cowl fairing member 140 extends rearwardly from the transverse reference plane 120 where the forward portion of the cowl fairing 140 is integral with the forward annular portion of the cowl 60 and extends rearwardly therefrom to the reference plane 74 at the forward end of the fixed turbine nozzle 76. The cowl fairing member 140 forms the outer portion of the cowl 60 adjacent the strut fairing 116 (FIGS. 4 and 9) and therefore conforms to the general overall curvature of the cowl. As best seen in FIG. 10, the central portion of the cowl fairing member 140 contains a longitudinal opening 141 that places the interior of the cowl 60 and thus the interior of the box structure 130 in communication with the exterior of the cowl 60. This opening 141 is shaped to conform generally to the outline of the strut fairing and places the interior of the strut fairing in communication with the interior of the nacelle assembly when the engine/nacelle assembly is mounted on the strut. Small removable panels 140a and 140b (shown in dotted outline in FIG. 10) are provided in the cowl fairing member 140 above and below the cowl fairing opening 141 at the mounting location of the forward mounting beam 100. Only the upper removable panel 140a can be seen in FIG. 7 while the gaps in cowl fiaring member 140 where the both panels have been removed can be seen in FIG. 10. The removable panels 140a and 140b are sufficiently wide to allow the upwardly and downwardly extending arms 102a and 102b of the mounting member 102 to pass the cowl fairing member 140 when the engine is being installed and removed. The cowl fairing member 140 is rigidified by conventional affixation to the stiffening ribs 138 spaced between the reference plane 120 and the aft reference plane 74. The upper longitudinally extending edge 142 of the cowl fairing member 140 is oriented substantially parallel to and is spaced upwardly from the horizontal reference plane intersecting the engine centerline 52 and serves as the separation location for the inner longitudinal edge of the upper removable cowl panel 60a and the cowl portion 60c (FIG. 2) of the upper D-duct 90. Likewise, the lower, longitudinally extending edge 144 of the cowl fairing member 140 is oriented substantially parallel to and is spaced downwardly from the horizontal reference plane and serves as the separation location for the inner edge of the lower removable cowl panel 60b and the inner edge of the cowl portion 60d (FIG. 2) forming part of the lower D-duct 92.

Since the box structure 130 has both a vertical and a radial dimension at its rearward terminus at the reference plane 74, an aerodynamic, aft fairing member 154 is attached to the inner portion of the turbine nozzle 76 and rearwardly converges to a trailing edge forwardly of the nozzle exit plane. The outer longitudinal edges of the aft fairing member 154 mate with the outer, rearward portion of the strut fairing 116 when the engine assembly is in place.

The box structure 130 serves as a ridigifying member for the central and rearward portions of the cowl fairing member 140 and as a means for attaching the cowl fairing member 140 as well as the removable cowl panels 60a and 60b and the D-ducts 90 and 92 to the engine. In addition, high pressure compressor bleed air conduits 150, connected to suitable couplings on the top of the engine, wrap circumferentially around the inside upper quarter of the turbine casing 50 and thereafter extend radially outwardly from the engine through the box structure 130 and into the interior of the strut fairing 116. From there, the bleed air conduits 150 extend as necessary into the fuselage and to support equipment on the aircraft that uses the bleed air in any of a variety of conventional manners, such as for air conditioning and as a pneumatic power fluid. In addition, a fan bleed air collector generally designated 152 is housed within the forward end of the box structure 130 adjacent the fan casing exit plane. The fan bleed air collector 152 radially spans a segment of the annular fan exit and contains a series of cascades to direct the air into a collector coupling 156 located within the box structure 130. The collector coupling 156 is coupled to an additional conduit that extends through the opening in the cowl fairing member 140 and into the interior of the strut fairing 116. In addition, this access route through the box structure 130 to the interior of the strut can be used for other necessary components such as fuel supply lines, hydraulic fluid supply lines, and engine accessory fluid and electrical lines.

Referring back to FIGS. 3 and 7, where the engine and nacelle assembly are shown mounted on the strut 40, it can be seen that the outwardly facing edge of the strut fairing 116 conforms to the curvature of the cowl 60 and cowl fairing member 140 from its leading edge to the exit plane 74 of the fan nozzle. Rearwardly of the reference plane 74, the outer edge of the strut fairing 116 mates with the inner edge of the inwardly extending, aft fairing member 154 affixed to the inner portion of the turbine nozzle 76. Conventionally, a seal (not shown) is interposed between the outer edges of the strut fairing 116 and the abutting surface of the cowl fairing member 140 to prevent airflow into or out of the interior of the strut fairing 116 or the nacelle assembly. This seal must also be designed to allow movement between the cowl fairing member 140 and the strut fairing 116 as the structure outboard of the strut is all rigidly attached to the engine and will therefore move relative to the strut as the engine moves or vibrates under load. The upper removable cowl fairing panel 140a and the lower removable panel 140b (not shown) are inserted in the cowl fairing member 140 at both locations above and below the strut fairing 116. The conical connecting pins 104 and 106 are attached to the mounting ring 108 integral with the fan casing 54. Likewise, the shock mounting assembly 114 attaches the rearward mounting beam 112 to the annular circumferential ring 162 integral with and surrounding the turbine section of the turbine casing 50. When the engine is affixed to the forward mounting strut and the rearward mounting beam 112, the high pressure bleed air conduits 150 are routed through the box structure 130 and into the channel between the upper and lower walls of the strut fairing 116. The bleed air conduits 150 are coupled by appropriate coupling means to the mating conduits 150a extending into the aircraft fuselage 30.

Figure 13:
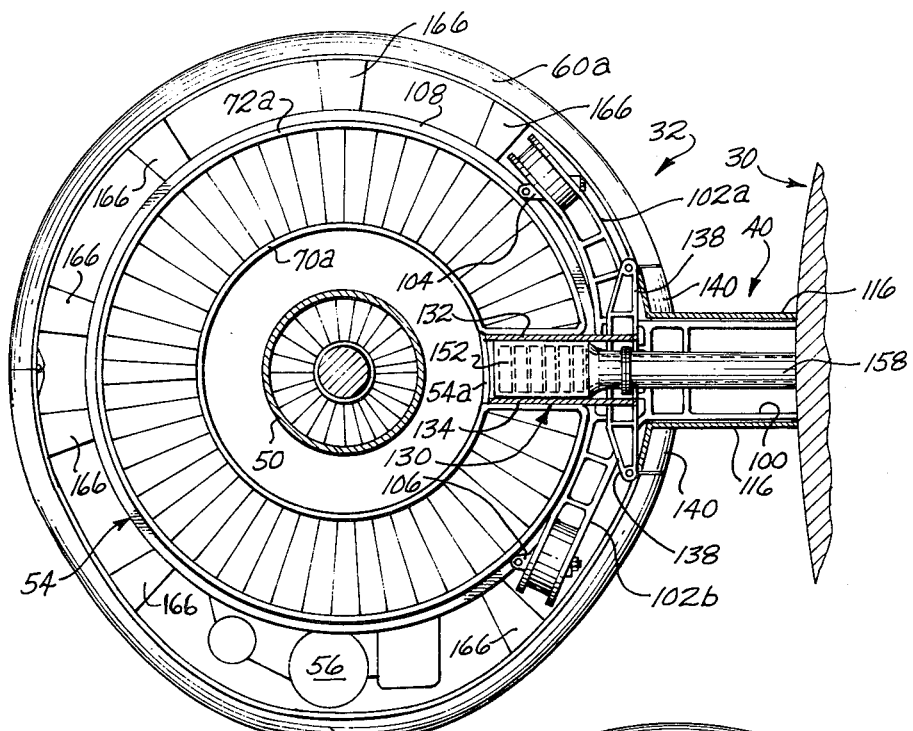
FIG. 13 is a cross-sectional view of the engine, nacelle assembly, and mounting structure of the present invention taken along section line 13—13 of FIG. 2.

Referring now to FIGS. 1, 8, 10, 13 and 14, the forward portion of the fan duct 68 is comprised of forward inner and outer fan duct walls 70a and 72a respectively. In FIG. 8 the inboard portion of the outer forward fan duct wall 72a is broken away to expose the box structure 130. The forward edges of the forward inner and outer fan duct walls 70a and 72a are respectively affixed by conventional fastening means to the inner and outer annular portions of the fan casing 54 and extend rearwardly therefrom. The inner and outer forward fan duct walls 70a and 72a terminate in rearward edges at the transverse reference plane 75 defined by the rearward edges of the removable cowl portions 60a and 60b and the forward edges of the plurality of walls in the D-ducts 90 and 92. Referring to FIG. 13, the upper wall 132 and the lower wall 134 of the box structure 130 are viewed in cross section extending transversely outwardly from the radial location of the inner fan casing wall 54a to the stiffening ribs 138 at the outer end of the box structure 130. The forward inner and outer fan duct walls 70a and 72a terminate in the circumferential direction, respectively, above and below the walls 132 and 134 of the box structure 130. The circumferential ends of the inner and outer fan duct walls 70a and 70b terminate immediately above the upper wall 132 of the box structure 130 and are joined by a connecting wall 170 that is oriented substantially parallel to and adjacent the upper wall 132 of the box structure 130. Likewise the inner and outer fan duct walls 70a and 72a terminate in the circumferential direction below and adjacent the lower wall 134 of the box structure 130 and are joined by an integral, transversely extending, connecting wall 172 that is oriented substantially parallel to the lower wall 134 of the box structure 130. Thus the inboard side of the forward portion of the fan duct 68 is bifurcated by the connecting walls 170 and 172 that join the forward portions of the inner and outer fan duct walls 70a and 72a. Thus, in cross section, the annularly shaped fan duct 68 has a C-shape, wherein the "C" is almost closed to form a complete annular structure. As can be seen in this view, the fan bleed air collector 152 is situated between the upper and lower walls 132 and 134 of the box structure 130 having its take-off coupling 156 located within the box structure 130. The bleed air conduit 176 extends inwardly from the collector coupling 156 toward the aircraft fuselage 30.

Figure 14:
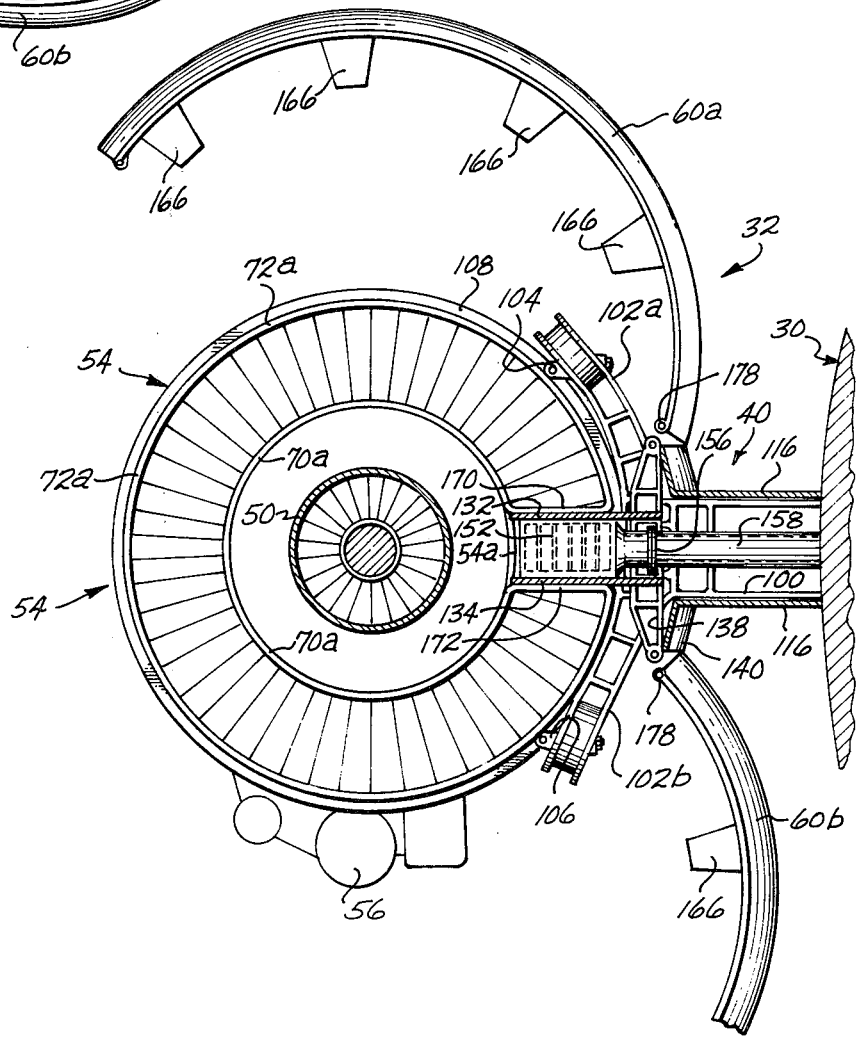
FIG. 14 is a cross-sectional view similar to FIG. 13 showing a portion of the outer cowl hinged to its open position to expose the fan casing and engine accessories.

The removable cowl panels 60a and 60b shown in FIG. 1 are omitted from FIGS. 8 and 10 but are shown in position in FIG. 13. The removable cowl panels 60a and 60b are spaced radially outwardly from the fan casing and outer fan duct wall 72a. Suitable spacers 166 maintain the appropriate radial spacing between the removable cowl panels 60a and 60b and the fan casing and outer fan duct wall 72a. The longitudinally extending inboard edges of the cowl panels 60a and 60b mate with the respective upper and lower edges of the cowl fairing member 140. Hinge members 178 are affixed adjacent the inner longitudinal edge of the cowl panels 60a and 60b and are provided with suitable hinge pins which are inserted through apertures in the respective upper and lower ends of the stiffening ribs 138. Although the hinge members 178 are shown as relatively simple members, they are not mutually axially aligned. Therefore, it is to be understood that the hinge pins from at least the central stiffening rib 138 must be removed through an access panel (not shown) in the removable cowl panels 60a and 60b in order for the cowl panels 60a and 60b to be swung respectively upwardly and downwardly as they are opened. As shown in FIG. 14, the hinge pins from the stiffening ribs 138c have been removed and the cowl panels 60a and 60b have been opened, i.e. respectively swung upwardly and downwardly about the hinge axes of stiffening ribs 138a and 138b. The cowl panels 60a and 60b are openable so that the fan casing and the accessories can be easily exposed for maintenance. In addition, the hinge pins connecting the cowl panels 60a and 60b to the stiffening ribs 138a and 138b can be removed so that the cowl panels 60a and 60b can be completely removed from the engine to facilitate removal of the engine from the strut structure 40.

Referring now to FIGS. 1, 8, 10, 11 and 12, the upper D-duct 90 and the lower D-duct 92 fit together to form rearward, annularly shaped continuations of the outer cowl 60, and the forward portions of the outer fan duct wall 72a and the inner fan duct wall 70a. The cowl portion 60c of the upper D-duct 90 has a smooth, rounded, inverted U-shape that forms a rearward continuation of the upper removable cowl panel 60a. The outer fan duct wall portion 72b of the upper D-duct 90 forms a rearward continuation of the upper half of the forward fixed fan duct wall 72a, while the inner fan duct wall portion 70b of the upper D-duct 90 forms a rearward continuation of the upper half of the forward portion of the fixed, inner fan duct wall 70a. In a similar manner, the cowl portion 60d, the outer fan duct wall portion 72c, and the inner fan duct wall 70c of the lower D-duct 92 form rearward extensions respectively of the lower removable cowl panel 60b, the lower portion of the forward outer fixed fan duct wall 72a, and the lower forward portion of the inner fixed fan duct wall 70a. Suitable connecting spacers 180 extend radially between and interconnect the cowl portions 60c, 60d and the outer fan duct walls 72b and 72c of the upper and lower D-ducts. It will be noted that the reverser panels 94 are located between each of the spacers 180 as the sectional view of FIG. 11 intersects them. Thus one of the turning axes in the reverser panel is seen between each of the spacers 180. Connecting spacers 182 extend radially between and are affixed to the inner and outer fan duct wall portions 70b and c and 72b and c of the D-ducts.

The inner end of the cowl portion 60c of the upper D-duct 90 terminates adjacent the upper longitudinal edge of the cowl fairing member 140. Suitable hinge members 184 are located adjacent the upper ends of the stiffening ribs 138d and 138e and are joined to the stiffening ribs by suitable connecting pins. The inboard ends of the inner and outer fan duct walls 70b and 72b of the upper D-duct 90 terminate in the circumferential direction in longitudinally extending edges adjacent the upper wall 132 of the box structure 130. A transversely extending wall 170a oriented substantially parallel to and adjacent the upper wall 132 interconnects the inboard ends of the inner and outer fan duct walls 70b and 72b of the upper D-duct 90. The interconnecting wall 170a forms a rearward extension of the connecting wall 170 of the forward fixed fan duct walls 70a and 72a. The outboard portions of the inner and outer fan duct walls 70b and 72b of the upper D-duct 90 terminate adjacent the horizontal reference plane extending through the center line of the engine/nacelle structure. The inner and outer fan duct walls of the upper D-duct are joined by a transversely, substantially radially extending, interconnecting wall 185 oriented parallel to and adjacent the aforementioned horizontal reference plane. Thus the inner and outer fan duct walls 70b and 72b and the outer cowl portion of 60c form a rigid, D-shaped structure that surrounds the upper half of the turbine casing 50.

In a similar manner, the cowl portion 60d of the lower D-duct 92 is joined by spacers 186 to the outer fan duct wall portion 72c of the lower D-duct 92, which in turn is affixed to the inner fan duct wall portion 70c of the lower D-duct 92 by spacers 188. The inboard ends of the inner and outer fan duct wall portions 70c and 72c terminate adjacent the lower wall 134 of the box structure 130 and are joined by transversely extending connecting wall 172a oriented parallel to and adjacent the lower wall 134 of the box structure 130. The connecting wall 172a forms a rearward extension of the connecting wall 172, forming part of the forward fixed fan duct. The outboard ends of the inner and outer fan duct portions 70c and 72c of the lower D-duct 92 terminate in the circumferential direction adjacent the horizontal reference plane extending through the center line of the engine. The outboard ends of the inner and outer fan duct walls 70c and 72c are interconnected by a transversely, substantially radially extending wall 190. Thus the components of the lower D-duct 92, similar to those of the upper D-duct 90, form a rigid, D-shaped structure that surround the lower half of the turbine casing 50. The cowl 60d of the lower D-duct 92 is provided with suitable hinge members 196 that are positioned adjacent the lower ends of the stiffening ribs 138d and 138e forming part of the box structure 130. Suitable hinge pins interconnect the hinge members 196 and the outer cowl 60d and thus the D-duct to the box structure 130. Suitable latch members 198 are attached to the upper and lower cowl segments 60c and 60d of the upper and lower D-ducts 90 and 92, respectively, adjacent the longitudinal separation line between those cowl segments. The latches 198 serve to disengagably fasten the upper D-duct 90 to the lower D-duct 92 to form a complete, annularly shaped nacelle structure surrounding the aft portion of the turbofan engine. The latch members are accessible for fastening and disengagement through access doors (not shown) in the cowl panels 60c and 60d.

Referring to FIG. 12, latch member 198 can be disconnected so as to disengage the upper D-duct 90 from the lower D-duct 92. The upper D-duct 90 can be swung upwardly by removing the hinge pins from the aft stiffening ribs 138e and swinging the upper D-duct 90 about the hinge member 184 connecting the upper D-duct 90 to the stiffening rib 138d. In a similar manner, the lower D-duct 92 can be swung downwardly to expose the bottom half of the turbine casing in the burner section area by removing the hinge pins affixing the lower D-duct to the lower end of the aft stiffening ribs 138e and swinging the D-duct downwardly about the hinge member 196 interconnecting the D-ducts with the stiffening rib 138d. If desired, the hinge pins interconnecting the stiffening rib 138c to the upper and lower D-ducts can be removed so that the D-ducts 90 and 92 can be completely removed from the nacelle structure.

In summary, referring to FIGS. 1, 8 and 10, it is readily understood that a basic part of the nacelle assembly for the turbofan engine is directly and nonremovably fixed to the fan casing 54 and the turbine casing 50, while the cowl panels 60a and 60b and the D-ducts 90 and 92 can be hinged open or completely removed for access to the engine for maintenance or removal. The fixed nacelle structure includes the inlet wall 62, the forward portion of the cowl 60, the cowl fairing member 140, the aft fairing member 154, the turbine nozzle 76 and the box structure 130 through which the accessory conduits, leads and controls pass. The forward end of the box structure 130 is fixed to the fan casing while the aft end of the box structure is fixed via the connecting links 135 to the aft end of the turbine casing. Where necessary, suitable spacers are provided between outer and inner walls such as between the forward portion of the cowl 60 and the forward portion of the inlet wall 62 and between the inner and outer walls of the turbine nozzle 76. Referring to FIGS. 3, 11, 12, 13 and 14, the nacelle assembly also includes removable portions that are also directly attached to the engine. As previously described, these removable portions include the upper and lower removable cowl panels 60a and 60b (FIGS. 13 and 14) forming the central portion of the cowl surrounding the inlet, fan casing and forward fixed wall portions of the fan duct, and the D-ducts (FIGS. 11 and 12) that form the aft end of the outer cowl and the aft portions of the fan duct. The removable cowl panels and the D-ducts are all removably mounted to the stiffening members 138 that form part of the box structure 130 and can be swung open for access to the accessories and to the central portion of the turbine casing 50 as desired. The removable cowl panels and the D-ducts can be completely separated from the box structure by removal of the appropriate hinge pins to facilitate removal of the engine from the strut 40. Thus the entire nacelle assembly is directly fixed to the engine so that the entire assembly moves with the engine when it torques about its center line, when it moves axially due to the thrust loads on the engine, or when it vibrates. Thus, in contrast to the prior art, no special provision need be made between the engine and nacelle structure to accommodate relative movement. Moreover, the entire nacelle structure can be significantly lightened as it does not constitute a stress bearing structure, that is, it does not support the engine weight or have to transmit any of the engine loads or movements to the mounting strut. The only movements that take place between the engine and the strut occur between the strut fairing 116 and the cowl fairing member 140. This occurs along the longitudinally extending mating region along the outer edge of the strut fairing. As previously mentioned, an appropriate seal is interposed between the strut fairing 116 and the cowl fairing 140 that will accommodate any movement while maintaining an airtight enclosure within the strut fairing 116 and the nacelle assembly.

Referring now to FIGS. 3, 15 and 16, the upper end of the upper arm 102a of the yoke-like mounting member 102 is slightly enlarged to accommodate a relatively large bore 200 in which a shock absorbing mounting structure is contained. The axis of the bore 200, represented by the dot-dash line 202 in FIG. 3, is oriented substantially radially relative to the center line of the engine. Likewise, the lower end of the lower arm 102b (not shown in FIGS. 15 and 16) of the mounting member 102 is enlarged to accommodate a lower bore. The lower arm 102b of the mounting yoke is constructed similarly to upper arm 102a which will be described in further detail below. The axis of the lower bore, represented by dot-dash line 206, is not radially oriented relative to the engine but is oriented to intersect the engine below its center line. The axis 202 of the upper bore 200 and the axis 206 of the lower bore intersect at a location in the lower, outboard quadrant of the engine, when viewed in orthogonal section. This intersection point 208 (FIG. 3) is chosen so that the center of mass of the engine (indicated by star 210) is located above the lower axis 206 and below the upper axis 202 and inside the intersection point 208. The center of mass 210 of the engine is defined by longitudinal and transverse coordinates relative to the centerline of the engine. The transverse coordinate falls within the region bounded by the bore axes 202 and 206 and the yoke (FIG. 3), and the longitudinal coordinate is spaced rearwardly from the region relative to the centerline of the engine. By so orienting the bores 200 and 204, the vibrational movements of the engine relative to the strut mounting structure can be minimized.

Referring now to the enlarged views of FIGS. 15 and 16 of the upper bore 200 in the upper arm 102a of the mounting member, an elastomeric mounting pad 212 formed in the shape of a cylinder is positioned within an annular retaining ring 214 having an outer diameter that fits tightly within the upper bore 200. The outboard end of the retaining ring has an inwardly extending shoulder 215 against which the outer peripheral portion of the mounting pad abuts, thereby retaining the pad within the ring 214. An annular retaining shoulder 216 is formed integrally with the upper arm 102a and extends radially inwardly toward the axis of the upper bore 200. The shoulder is sized so that the elastomeric mounting pad 212 and the retaining ring 214 abut against the shoulder 216 leaving a circular opening 218 on the inboard side of the mounting member 102. Suitable fasteners 219 extend through appropriate bores in a radially outwardly extending annular shoulder on the outboard end of the retaining ring 214 and extend into the arm 102a adjacent the upper bore 200. The fasteners 219 secure the retaining ring 214 and thus the elastomeric mounting pad 212 within the upper bore 200. A conical connecting pin 106 is mounted within a conically shaped sleeve 220, in turn positioned in a conical bore through the elastomeric mounting pad. The conical bore in the elastomeric mounting pad is oriented transversely to the axis 202 of the upper bore 200. A yoke 221 on the inner end of the conical connecting pin 106 is coupled to the retaining ring 108 on the fan casing 54. Suitable bores in the yoke 221 and in the bracket 110 are mutually aligned so that a suitable connecting bolt 222 can be inserted through the bores in the connecting pin 106 and through the mutually aligned bore in the retaining ring 108 to secure the engine to the upper arm 102a in a predetermined position. The outer end of the conical connecting pin 106 extends through the elastomeric mounting pad 212 and is provided with an appropriately shaped washer structure 224. The connecting pin 106 is secured to the elastomeric mounting pad 212 by an internally threaded nut 226 that threadably engages the outer end of the connecting pin 106. In the unlikely happenstance that the shock mounting structure should fail, a pair of safety straps 228 interconnecting the upper arm 102a with the fan casing 54 can be provided. Under normal conditions the straps are sufficiently flexible not to interfere with the vibration absorbing characteristics of the elastomeric mounting pad 212.

Referring now to FIG. 17, the rear shock mounting assembly 114 for interconnecting the rear mounting beam 112 and the turbine casing 50 is shown in an enlarged isometric view. The outer end of the beam 112 has a pair of vertically spaced, outwardly extending arms 112a and 112b that serve as mounting points for the elastomeric shock mounting assembly 114. Disregarding the thrust connecting yoke 262, which will be described below, the mounting assembly 114 comprises a cylindrically shaped, elastomeric mounting pad 230 and a conically shaped bolt 232 that extends inwardly through a conically shaped bore 234 in the central portion of the elastomeric mounting pad 230. The mounting pad 230 is fastened between the arms 112a and 112b by suitable fasteners that extend through bores in the bars and that engage suitable axially oriented, internally threaded sleeves embedded in the mounting pad. The bolt 232 is secured to the mounting pad 230 by a suitable, internally threaded nut 236. The bolt 232 extends outwardly from the mounting assembly 114 and is oriented substantially along a radius of the engine. The head of the bolt 232 has a transverse bore oriented parallel to the center line of the engine through which a fastening bolt 238 is inserted. A plurality of links, in this embodiment four links 240, comprise straight bars having bores through each end thereof. One end of each of the four links is secured to the conical mounting bolt 232 by the fastening bolt 238. Two of the bars extend upwardly in a generally tangential direction relative to the turbine casing and two of the bars extend downwardly from the conical mounting bolt 232 in a generally tangential direction relative to the turbine casing 50. As previously mentioned, the turbine casing (not shown in FIG. 17) has an appropriately located, radially outwardly extending annular coupling flange 162 (FIG. 7) integral therewith. The coupling flange has a plurality of longitudinally oriented bores therethrough which are aligned with the bores in the outer ends of the connecting links 240. The links are fastened to the coupling flange by suitable bolts (not shown). Thus the rear end of the engine is shock mounted via the turbine casing to the rear mounting beam 112.

Figure 18:
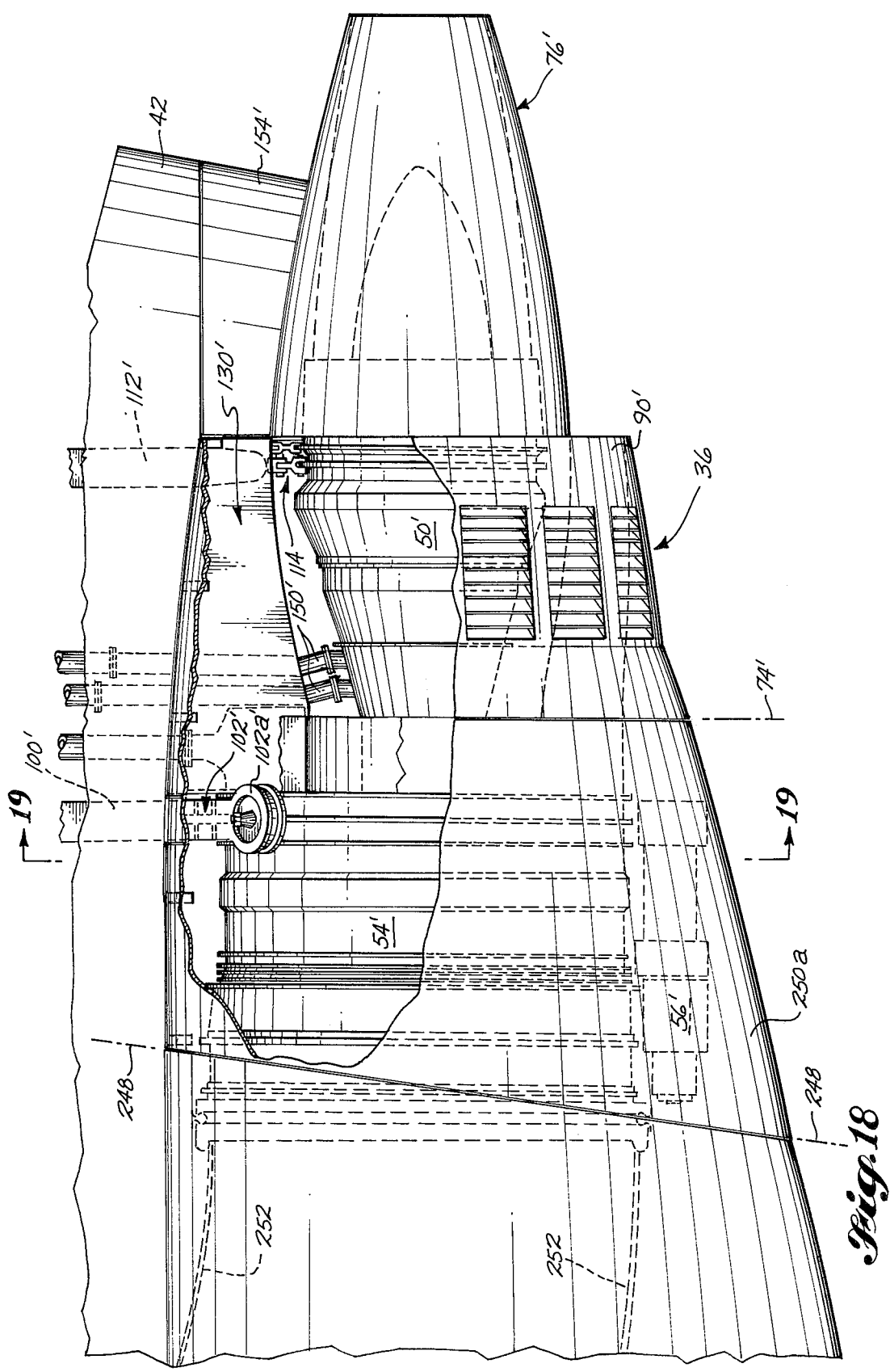
FIG. 18 is a side elevation view partially broken away showing the minor modifications necessary to adapt the engine and nacelle assembly to a rear fuselage mounting configuration.
Figure 19:
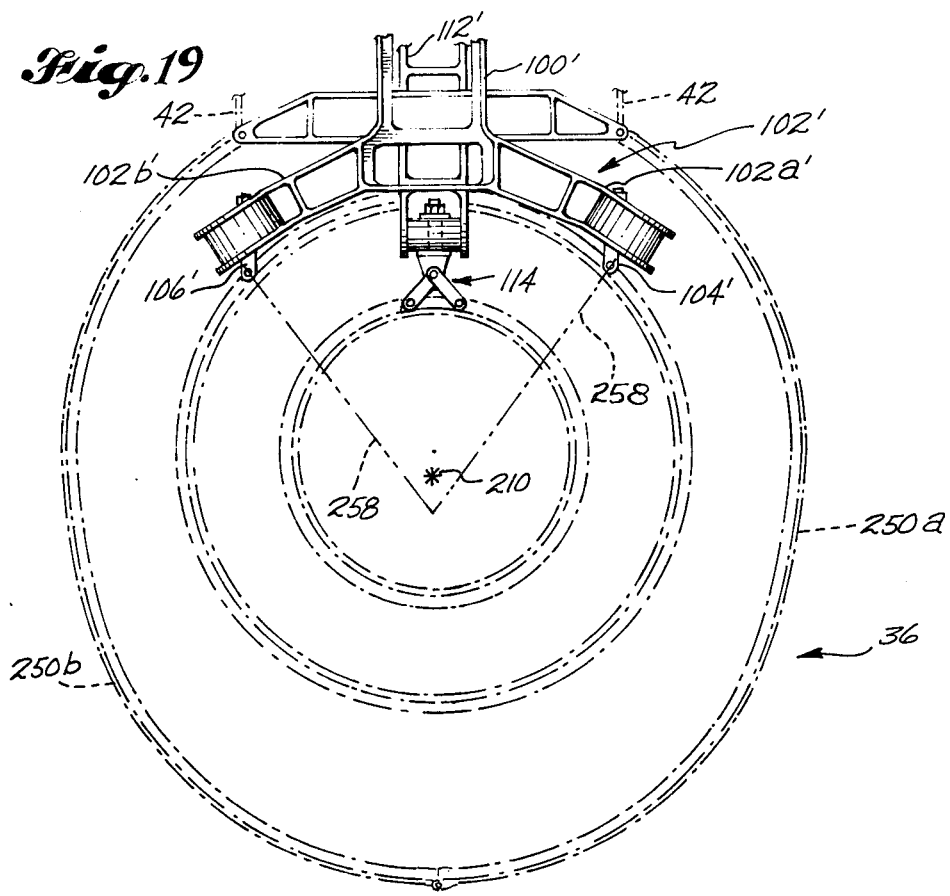
FIG. 19 is a cross-sectional view partially in phantom outline of the rear fuselage mounting structure of the present invention taken along section line 19—19 of FIG. 18.

Referring now to FIGS. 1, 18 and 19, the aft tail mounted engine 36 includes many of the same structural nacelle components as the side strut mounted engine 32 previously described. The basic engine comprises the fan casing 54' and the turbine casing 50'. The fixed nozzle structure 76' is attached to the aft end of the turbine casing 50' and is identical to the turbine nozzle 76 of the other engine. The box structure 130' is identical in construction to the box structure 130 of the side mounted engine. The removable D-ducts 90' and 92' (the latter of which is not seen in FIGS. 18 and 19) are identical to those employed with the side mounted engines.

The removable cowl panels 250a and 250b located forwardly of the D-ducts are configured somewhat differently for the aft fuselage mounted engine. The aft edges of the removable cowl panels 250a and 250b mate with the forward edges of the outer cowl portion of the D-ducts along the orthogonal reference plane 74' at the forward edge of the D-duct. The forward edges of the removable cowl panels 250a and 250b are separated from the remainder of the aircraft fuselage 30 along a transverse reference plane 248 oriented transversely relative to the engine center line 52' that slopes from the top downwardly and forwardly. The aft fuselage mounted engine 36 does not include a forward inlet structure like that of the strut mounted engine 32 but is coupled to an internal inlet duct 252 that couples the fan casing 54' with the inlet structure 44 on the top of the fuselage forward of the vertical stabilizer 42. In this mounting location, the cowl fairing 140 can be omitted, as the sides of the vertical fin intersect the nacelle assembly adjacent the separation lines for the cowl panels 250a and 250b and the D-ducts 90' and 92'. Suitable seals are provided between the bottom edges of the fin and the cowl panels and D-ducts. An aft fairing member 154' extends rearwardly from the box structure 130' and is identical in construction to that of the aft fairing member 154 of the strut mounted engine 32 except that its trailing edge 256 makes a different angle with the fixed turbine nozzle 76' so that its trailing edge forms a downward extension of the trailing edge of the vertical stabilizer 42.

In a manner identical to that of the strut mounted engine on the port side of the fuselage, a forward mounting beam 100' extends downwardly from the fuselage and from the vertical stabilizer 42 and bears an integral mounting member 102' having two arms 102a' and 102b' holding shock mounted conical connecting pins 104' and 106'. The connecting pins are attached to a suitable mounting ring 108' provided on the fan casing. It should be noted that the axes 258 of the bores in the arms 102a' and 102b' are oriented relative to the engine center line 52' in a slightly different manner from the side mounted engines in that both axes extend in a generally radial direction inwardly relative to the engine but intersect at a location below the center line of the engine and below the center of mass 210' of the engine. Similar to the side mounted structure a rear mounting beam 112' extends downwardly from the fuselage and is connected to a circumferential coupling ring on the turbine casing via a rear shock mounting assembly 114'. In this mounting location the engine is still oriented upright causing the tap locations for the high pressure bleed air conduits to be located adjacent the box structure 130' rather than being rotated 90° about the engine. Thus the bleed air conduits 150' extend directly upwardly from the engine through the box structure 130' and into the fuselage of the aircraft.

In this manner, the same basic engine structure can be utilized for mounting substantially the same engine and nacelle assembly on the sides of the aircraft fuselage as can be utilized for mounting the engine structure in the tail of the fuselage below the vertical stabilizer. The only changes required to mount the engine in the aft end of the fuselage are the reconfigured cowl panels 250a and 250b, the appropriate adapting structure for connecting the fan casing 54' to the inlet duct 252 in the fuselage, ommission of the cowl fairing 140 and rotation of the box structure 130' around the engine. The D-duct structures remain the same as well as the fixed turbine nozzle 76' for all engine mounting locations. Otherwise, the bleed air conduits 150' and all accessory conduits and leads, including fuel lines, can be extended from the fuselage downwardly through the box structure 130' and attached to the appropriate locations on the engine. For access to the accessories 56' on the bottom of the fan casing, the removable cowl panels can be swung outwardly and upwardly in a manner similar to the cowl panels of the strut mounted engine 32. In addition, the D-ducts can be swung upwardly and outwardly to expose the turbine casing 50' in a manner similar to that of the D-ducts on the strut mounted engine 32.

Figure 20:
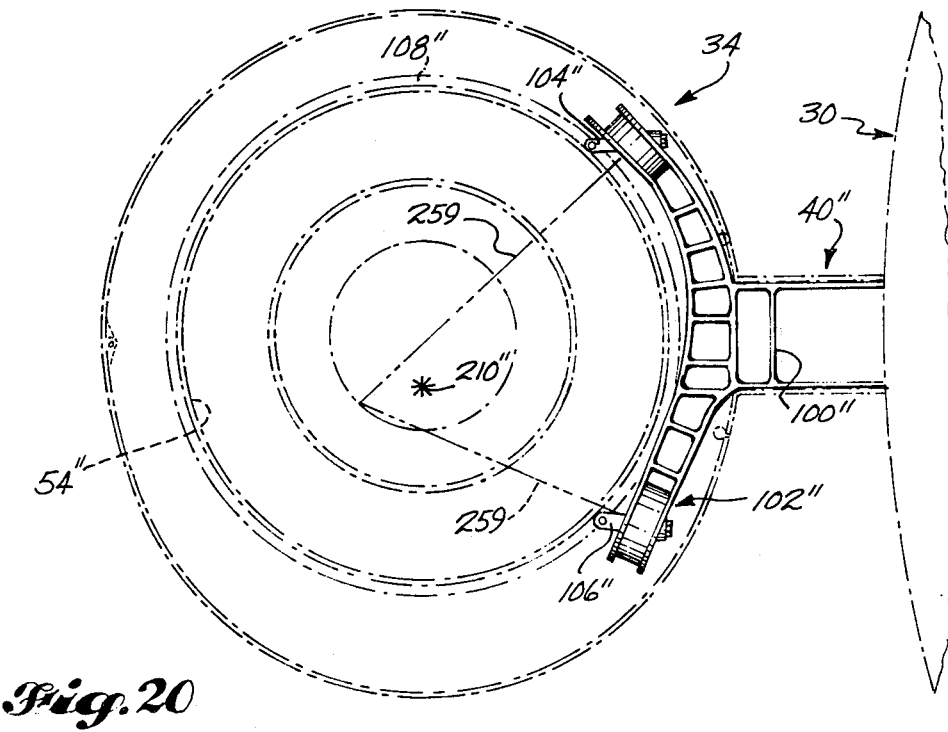
FIG. 20 is a cross-sectional view of the strut mounted engine and nacelle assembly of the present invention on the starboard side of the aircraft, which constitutes a mirror image of section 3—3 of FIG. 2.

A cross-sectional view of the starboard strut mounted engine is illustrated in FIG. 20. As will be noted, this view is a mirror image of the port engine shown in FIG. 3. In this embodiment, the mounting member 102" affixed to forward mounting beam 100" has the bores in its upper and lower ends for holding the shock mounting pads oriented so that the axes 259 of the bores pass on each side of and intersect outboard from the center of mass 210" of the engine. In all other respects, the mounting structure constitutes the mirror image of that disclosed and described in conjunction with the port engine 32. The mounting ring 108" on the fan casing 54" is provided with appropriate mounting holes on the opposite side of the engine from the mounting holes in the ring 108 on the port engine 3 for attachment of the mounting pins 104" and 106". The box structure (not seen in the phantom outline) is rotated to the opposite side of the engine from its mounting location for use on the port side of the aircraft. The accessory conduits and bleed air conduits then extend from the top of the engine in a clockwise direction approximately 90° about the turbine and through the starboard box structure and into the starboard strut 40".

Although not previously mentioned, the D-duct structures can be manufactured so that they are symmetrical about the horizontal reference plane intersecting the engine center line for the side mounted engines and symmetrically about a vertical reference plane intersecting the center line of the engine for the tail mounted engine. When constructed in this manner, the same D-ducts can be used for each of the three engines so that only two mating D-duct sections need be manufactured for use in all three engine locations, greatly reducing the tooling costs and other fixed, non-recoverable costs in designing and manufacturing a jet propulsion engine nacelle.

Although the forward mounting member, including the mounting beam 100 and the forward mounting member 102, is designed to transmit axial thrust loads from the engine to the fuselage, it may, under certain conditions, be desirable to employ an additional member for transmitting axial thrust loads from the engine to the aircraft fuselage, and specifically, for transmitting a portion of the thrust load to the rear mounting beam 112. Referring to FIGS. 21 and 22, a thrust yoke 260 is shown in location on the port engine 32. The thrust yoke extends from the shock mounting assembly 114 on the rear mounting beam 112 and branches into two diverging arms as it extends forwardly through the box structure 130 and angles somewhat radially inwardly toward the inner portion of the fan structure. The two forward arms of the thrust yoke terminate at locations radially inwardly from the inner fan casing wall adjacent the turbine casing 50 on each side of a horizontal reference plane intersecting the engine center line. The aft end of the thrust yoke 260 bears a connecting yoke 262 that can be attached to a forwardly extending flange 264 on the elastomeric mounting pad 230 attached to the rear mounting beam 112. (See FIG. 17). A suitable fastener 266 fastens the connecting yoke 262 to the forwardly extending flange 264 in a conventional manner.

The aft end of the connecting yoke 262 is situated within the box structure 130 forming part of the nacelle assembly. The two arms of the thrust mounting yoke emerge from the inner side of the box structure allowing the bleed air conduits 150 to be routed between the two forward arms of the thrust yoke. The forward ends of the arms also bear small connecting yokes 270, the upper of which is illustrated in FIG. 23. The forward connecting yokes 270 are attached to brackets 272 by a suitable fastener 274. The bracket 272 is affixed to the forward end of the turbine casing adjacent the aft end of the fan casing 54 by a plurality of suitable fasteners 276. Thus, thrust loads on the engine are not only transmitted to the fuselage via the forward connecting yoke 102 but are also transmitted via the bracket and two arms of the thrust yoke 260 to the rear mounting beam 112, and in turn to the fuselage. In this manner, the thrust load can be divided between the two beams 100 and 112 and are not entirely concentrated in the forward mounting beam 100.

Although the foregoing invention has been described in relation to a preferred embodiment, it will be understood by one of ordinary skill in the art that various alterations, substitutions of equivalents and other changes can be made without departing from the broad concepts disclosed as they relate to an engine nacelle assembly that can be interchangeably mounted on appropriate struts on the sides of an aircraft fuselage as well as in the aft portion of the fuselage itself. Moreover, it is to be understood that various modifications can be made in the nacelle configurations to suit a particular engine. Various additional accessory panels for access through the cowl and nacelle assembly can also be provided where necessary. In addition, the D-duct structure can be modified to incorporate various fan thrust reversing mechanisms designed to suit a particular need. Various shock mounting assemblies can also be employed for interconnecting the mounting beams and the turbine and fan casings. It is therefore intended that the invention as disclosed herein be limited only by the definition contained in the appended claims.

What is claimed is:

1. In a structure for mounting a turbofan engine on a aircraft fuselage, said turbofan engine having a high bypass ratio and including a turbine casing housing a turbine engine, the rearward end of a turbine nozzle operably associated with said turbine casing for directing propulsion gases rearwardly from said engine, an annular fan casing surrounding and spaced outwardly from said turbine casing, a low pressure fan mounted within said fan casing and driven by said turbine engine, said fan casing being structurally coupled to said turbine casing, an improved structure for interchangeably mounting said turbofan engine to a plurality of locations on a fuselage comprising:

a structural yoke and means for affixing said yoke to the fuselage of an airplane, said yoke extending about a portion of the periphery of said fan casing and being spaced therefrom, said yoke having a central portion, a first end spaced in a first direction from said central portion and a second end spaced in the opposite direction from said central portion, first shock absorbing mounting means associated with the first end of said yoke for releasably coupling the first end to a first location on the periphery of said fan casing, second shock absorbing mounting means associated with the second end of said yoke for releasably coupling the second end of said yoke to a second location on the periphery of said fan casing, said second location being spaced from said first location, a mounting arm and means for affixing said arm to the fuselage of an airplane, said arm having an outer end located adjacent said turbine casing and rearwardly from said yoke, said arm extending in a generally radial direction toward said turbofan engine, third shock absorbing mounting means associated with the outer end of said arm for releasably coupling said outer end to said turbine casing, nacelle means associated with said engine and including inner and outer fan duct walls defining an annular fan duct associated with and extending rearwardly from said fan casing for receiving fan air from said fan and directing said fan air rearwardly relative to said engine, and bifurcation means affixed to said engine and associated with said fan duct for splitting the flow of air therethrough, said bifurcation means extending longitudinally along said duct from a forward location adjacent said fan casing to a location rearwardly thereof, said bifurcation means being located in said fan channel adjacent the central portion of said yoke and having a central channel therethrough communicating between the region inside the inner fan duct wall and the region outside the outer fan duct wall, said mounting arm extending through said central channel, said nacelle means being coupled to said bifurcation means and said engine so as to be isolated from said mounting arm and said yoke when said engine is mounted thereon, and to remain coupled to said bifurcation means and said engine when said engine is released from said yoke and said mounting arm.

2. The structure of claim 1 wherein said yoke comprises a rigid arcuate member, said means for affixing the central portion of said yoke to said airplane comprising a beam affixed to said yoke and extending outwardly from said yoke in a radial direction relative to said engine, the outer end of said beam being affixed to said fuselage.

3. The mounting structure of claim 2 wherein said beam is integral with said yoke.

4. The structure of claim 1 wherein said turbofan engine includes bleed air conduits extending from said turbine casing, through said central channel in said bifurcation means and toward said fuselage.

5. The structure of claim 1 further comprising conduit means coupled to the top of said casing of said turbine engine and having an inlet so constructed and located to receive bleed air aft of the compressor of said turbine engine, said conduit means extending in a circumferential direction around said turbine casing to a location generally adjacent and between the inner wall of the fan duct and the outer surface of the turbine casing and thereafter through the central channel in said bifurcation means to a location outside said cowl means.

6. The structure of claim 1 wherein said nacelle means further comprises an outer nacelle wall, said outer nacelle wall being spaced outwardly from said outer fan duct wall to define an annular space therebetween, and wherein said yoke is located between said fan casing and said outer nacelle wall and forwardly from said bifurcation means, said nacelle wall having an opening therein located adjacent the central portion of said yoke and forwardly of said forward location of said bifurcation means, said means mounting said yoke to said fuselage including a beam affixed to said yoke, said beam extending substantially radially outwardly through said opening.

7. The structure of claim 6 further comprising:

an aerodynamic fairing extending between said nacelle wall and said fuselage, said fairing having a channel therethrough placing the central channel in said bifurcation means and said opening in said nacelle wall in communication with said fuselage, said beam and said arm extending through the channel in said fairing.

8. The structure of claim 1 wherein said fan has a forwardly facing annular inlet, said nacelle means comprising:

a first annular wall located forwardly from and coupled to the forward portion of said fan casing, said first wall defining an inlet channel to said fan, a second, generally annularly shaped wall surrounding and spaced outwardly from said first wall and said outer fan duct wall, the rearward end of said second wall merging into the rearward portion of said outer fan duct wall at a location rearwardly from said fan, the forward portion of said second wall being arcuate and merging into the forward portion of said first wall, said first wall and the forward portion of said second wall thereby forming the leading edge of said nacelle means, said bifurcation means extending generally radially between and connected to said inner and outer fan duct walls, said bifurcation means extending longitudinally from a location rearwardly of said fan to a location forwardly of the exhaust nozzle of said turbine.

9. The mounting structure of claim 8 wherein said means mounting said yoke extends from said yoke to said fuselage, said mounting arm extending from said engine to said fuselage, said mounting means and said arm forming a strut for mounting said engine on said fuselage, said strut being enclosed in an aerodynamic fairing extending between said nacelle means and said fuselage, and wherein portions of said inner and outer fan duct walls and said second wall are separated at first locations from the respective forward portions thereof along a first plane oriented transversely to the longitudinal axis of said engine, said first plane being located rearwardly from said fan casing, said portions being further separated from any rearward portions thereof at a second plane oriented transversely relative to the longitudinal axis of said engine, said second plane being spaced rearwardly from said first plane, said portions further being separated along a longitudinal line located substantially diametrically opposite from said strut, and extending from said first plane to said second plane, the separated portion of said second wall further being separated from the remainder of said second wall along longitudinally extending lines located on both sides of, but adjacent and offset from, said strut, the portions of said second wall between the latter longitudinal separations being fixed to said engine, said inner and outer fan duct walls further being separated along longitudinal lines adjacent said strut and spaced in the tangential direction relative to the walls on each side of a longitudinally extending diametric plane intersecting said struct and intersecting said first longitudinal separation locations of said second and inner and outer fan duct wall portions, said mounting structure further comprising:

a first longitudinally extending wall joining the separated portions of said inner and outer fan duct walls adjacent a first side of said strut, said first longitudinally extending wall being spaced from and substantially parallel to said diametric plane on said first side thereof, a second longitudinally extending wall joining the separated portions of said inner and outer fan duct walls adjacent a second side of said strut, said second longitudinally extending wall being spaced from and substantially parallel to said diametric plane on said second side thereof, a third longitudinally extending wall joining the separated portions of said inner and outer fan duct walls adjacent the longitudinal separation location opposite said strut and adjacent and substantially parallel to one side of said diametric plane, a fourth longitudinally extending wall joining separated portions of said inner and outer fan duct walls at the longitudinal separation location diametrically opposite from said strut and adjacent and substantially parallel to the other side of said diametric plane, means for fixing the separated portions of said inner fan duct wall to and spacing the separated portions of said inner fan duct wall from radially adjacent ones of the separated portions of said outer fan duct wall, said separated portions of said second and said inner and outer fan duct walls thereby forming a pair of D-shaped duct portions that when joined together form said annularly shaped fan duct, said first and second longitudinally extending walls forming a portion of the bifurcation means for splitting the flow through one side of said annular fan duct, said annular fan duct further containing a forwardly extending member forming a forward extension of the portion of the bifurcation means formed by said first and second longitudinally extending walls, and first hinge means for connecting a first one of said D-ducts to said engine for swinging movement between a joined position and a position wherein said ducts are swung outwardly to expose a portion of said engine means, and second hinge means for connecting the second one of said D-ducts to said strut for swinging movement between a joined position and a position wherein said ducts are swung outwardly to expose a portion of said engine means, said bifurcation means including a box-like member securely affixed to said engine and positioned between said first and second longitudinally extending walls, said channel in said bifurcation means being defined within said box-like member, said first and second hinge means coupling respective ones of said D-ducts to said box-like member.

10. The mounting structure of claim 9 wherein said first and second walls terminate and merge at a location adjacent said second transversely oriented plane.

11. In a structure for mounting a turbofan engine on an aircraft fuselage, said turbofan engine having a high bypass ratio and including a turbine casing housing a turbine engine, the rearward end of a turbine nozzle operably associated with said turbine casing for directing propulsion gases rearwardly from said engine, an annular fan casing surrounding and spaced outwardly from said turbine casing, a low pressure fan mounted within said fan casing and driven by said turbine engine, said fan casing being structurally coupled to said turbine casing, an improved structure for interchangeably mounting said turbofan engine to a plurality of locations on a fuselage comprising:

a rigid, arcuate, structural yoke and means for affixing said yoke to the fuselage of an airplane, said yoke extending about a portion of the periphery of said fan casing and being spaced therefrom, said yoke having a central portion, a first end spaced in a first direction from said central portion and a second end spaced in the opposite direction from said central portion, said means for affixing the central portion of said yoke to said fuselage including a beam affixed to said yoke and extending outwardly from said yoke in a radial direction relative to said engine, the outer end of said beam being affixed to said fuselage, each of said first and second ends of said yoke having bores therein, each of said bores having an axis, the axes of said bores intersecting to define a region in a transverse plane relative to said engine bounded by said axes and said yoke, said engine having a center of mass defined by longitudinal and transverse coordinates relative to the centerline of said engine, said axes of said bores being oriented so that said transverse coordinate falls within said region, said longitudinal coordinate being spaced rearwardly from said region relative to said engine, first shock absorbing mounting means associated with the bore in the first end of said yoke for coupling the first end to a first location on the periphery of said fan casing, second shock absorbing mounting means associated with the bore in the second end of said yoke for coupling the second end of said yoke to a second location on the periphery of said fan casing, said second location being spaced from said first location, a mounting arm and means for affixing said arm to the fuselage of an airplane, said arm having an outer end located adjacent said turbine casing and rearwardly from said yoke, said arm extending in a generally radial direction toward said turbofan engine, third shock absorbing mounting means associated with the outer end of said arm for coupling said outer end to said turbine casing, and nacelle means associated with said engine defining an inlet coupled to said fan casing and defining an annular fan duct extending rearwardly from said fan casing for receiving fan air from said fan and directing said fan air rearwardly relative to said engine.

12. The structure of claim 11 wherein each of said first and second mounting means comprises a cylindrically shaped, resilient element having an axis of revolution, said elements being positioned coaxially within respective ones of said bores, said resilient elements each having a centrally located bore therein, and means affixing each of said resilient elements to said yoke, said fan casing having first and second brackets thereon, said mounting means further comprising first and second rods connected to respective ones of said brackets, said rods extending toward respective ones of said resilient elements and into the respective bores therein, said rods being affixed to respective ones of said resilient elements, said resilient elements thereby resiliently mounting said engine to said yoke.

13. The structure of claim 12 wherein each of said bores in said resilient elements is frustoconically shaped and has a central axis, said central axis being oriented transversely to the axis of revolution of the respective bores in said yoke, and wherein each of said rods comprises a conically shaped bolt having means on one end thereof for securing said bolt to a respective one of said brackets, and means on the other end thereof for securing said bolt to a respective one of said resilient elements.

14. In a structure for mounting a turbofan engine on an aircraft fuselage, said turbofan engine having a high bypass ratio and including a turbine casing housing a turbine engine, the rearward end of a turbine nozzle operably associated with said turbine casing for directing propulsion gases rearwardly from said engine, an annular fan casing surrounding and spaced outwardly from said turbine casing, a low pressure fan mounted within said fan casing and driven by said turbine engine, said fan casing being structurally coupled to said turbine casing, an improved structure for interchangeably mounting said turbofan engine to a plurality of locations on a fuselage comprising:

a rigid, arcuate, structural yoke and means for affixing said yoke to the fuselage of an airplane, said yoke extending about a portion of the periphery of said fan casing and being spaced therefrom, said yoke having a central portion, a first end spaced in a first direction from said central portion and a second end spaced in the opposite direction from said central portion, said means for affixing the central portion of said yoke to said fuselage including a beam affixed to said yoke and extending outwardly from said yoke in a radial direction relative to said engine, the outer end of said beam being affixed to said fuselage, first shock absorbing mounting means associated with the first end of said yoke for coupling the first end to a first location on the periphery of said fan casing, second shock absorbing mounting means associated with the second end of said yoke for coupling the second end of said yoke to a second location on the periphery of said fan casing, said second location being spaced from said first location, a mounting arm and means for affixing said arm to the fuselage of an airplane, said arm having an outer end located adjacent said turbine casing and rearwardly from said yoke, said arm extending in a generally radial direction toward said turbofan engine, third shock absorbing mounting means associated with the outer end of said arm for coupling said outer end to said turbine casing, nacelle means associated with said engine including an outer annular wall and an inner annular wall, said inner annular wall being spaced outwardly from said turbine casing, said inner and outer annular walls defining an inlet coupled to said fan casing and defining an annular fan duct extending rearwardly from said fan casing for receiving fan air from said fan and directing said fan air rearwardly relative to said engine, bifurcation means associated with said annular fan duct for splitting the flow therethrough, said bifurcation means extending longitudinally along said duct from a forward location adjacent said fan to a location rearwardly thereof, said bifurcation means being located in said fan channel adjacent the central portion of said yoke and having a central channel therethrough communicating between the region inside the inner wall of said fan duct and the region outside the outer wall of said fan duct, said arm extending through said central channel, and a fan bleed air collector mounted in the forward portion of said bifurcation means and having an inlet opening forwardly toward said fan, and conduit means coupled to said collector and located within the channel in said bifurcation means and extending therethrough toward said fuselage, said conduit means for receiving fan air from said inlet and directing it to a location in said fuselage.

* * * * *